(12) United States Patent
Miyoshi et al.

(10) Patent No.: US 8,295,353 B2
(45) Date of Patent: Oct. 23, 2012

(54) IMAGE ENCODING DEVICE, IMAGE ENCODING CONTROL METHOD, AND PROGRAM

(75) Inventors: Hidenobu Miyoshi, Kawasaki (JP); Toshikazu Senuki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 12/717,662

(22) Filed: Mar. 4, 2010

(65) Prior Publication Data
US 2010/0226440 A1 Sep. 9, 2010

(30) Foreign Application Priority Data
Mar. 5, 2009 (JP) ................................ 2009-051542

(51) Int. Cl.
*H04B 1/66* (2006.01)
(52) U.S. Cl. ................................................. 375/240.16
(58) Field of Classification Search ........... 375/240.02–240.16; *H04B 1/66*
See application file for complete search history.

(56) References Cited

U.S. PATENT DOCUMENTS

| | | | |
|---|---|---|---|
| 5,815,209 A | | 9/1998 | Kondo |
| 5,818,529 A | * | 10/1998 | Asamura et al. ......... 375/240.23 |
| 7,352,905 B2 | * | 4/2008 | Mukerjee et al. ............. 382/236 |
| 7,680,185 B2 | * | 3/2010 | Mukerjee et al. ......... 375/240.15 |
| 2006/0023788 A1 | * | 2/2006 | Otsuka et al. ............ 375/240.16 |
| 2007/0297511 A1 | * | 12/2007 | Chiu et al. ............... 375/240.16 |

FOREIGN PATENT DOCUMENTS

| | | |
|---|---|---|
| JP | 1995-135654 A | 5/1995 |
| JP | 1998-276437 A | 10/1998 |
| JP | 2000-165883 A | 6/2000 |

* cited by examiner

*Primary Examiner* — Tung Vo
(74) *Attorney, Agent, or Firm* — Fujitsu Patent Center

(57) ABSTRACT

An image encoding control method for controlling processing for encoding data of an input moving image based on an interlace system comprises: a step of determining whether or not a chrominance-component motion vector generated based on the luminance-component motion specifies a reference prohibition region preset at least one of outside an upper boundary and outside a lower boundary of the reference image, for each combination of a field type of the region to be encoded and the field type of the reference image; and a step of prohibiting, when the chrominance-component motion vector generated based on the luminance-component motion vector specifies the reference prohibition region, the luminance-component motion vector from being output as a motion vector specifying a region that is most similar to the region to be encoded.

14 Claims, 22 Drawing Sheets

IMAGE ENCODING DEVICE, IMAGE ENCODING CONTROL METHOD, AND PROGRAM

CROSS-REFERENCE TO RELATED APPLICATIONS

This application is based upon and claims the benefit of priority from the prior Japanese Patent Application No. 2009-51542 filed on Mar. 5, 2009, the entire contents of which are incorporated herein by reference.

FIELD

The present invention relates to an image encoding device, an image encoding control method, and a program for encoding data of an input moving image based on an interlace system by using a moving-image coding system that allows a chrominance-component motion vector to be generated during decoding based on a luminance-component motion vector.

BACKGROUND

In general, since the amount of moving-image data is large, the moving-image data is in many cases subjected to compression coding processing when the moving-image data is transmitted from a transmitting device to a receiving device or when the moving-image data is stored in a storage device. As typical moving-image compression coding systems, MPEG (Moving Picture Experts Group) 2 and MPEG 4, which are developed by ISO/IEC (International Standardization Organization/International Electrotechnical Commission), are widely used.

One characteristic element technology for the MPEG system involves performing motion prediction by referring to a temporally previous image that has already been coded or by referring to previous and subsequent images and performing coding using the prediction values. During such coding, block data of a current image and block data of a reference image obtained by decoding an already encoded image are used to determine a motion vector. The motion vector is a value indicating the amount of spatial movement for each block and is determined using a block matching technique or the like for searching for, from the reference image, the position of a region that is the most similar to the current image for each block.

In MPEG-4, the motion vector is also permitted to specify a region outside the boundary of an input image. In other words, it is possible to perform motion compensation by referring to a region located outside the boundary of an input image. When a region specified by a motion vector is located outside the boundary of an input image, the region of the reference image is extended based on the values of pixels in the vicinity of the boundary of the reference image decoded within an encoding circuit and the values of the extended region are used as prediction values.

H.264 proposed by the ITU (International Telecommunication Union) is attracting attention as a compression coding system that is capable of transferring a high-quality moving image with a smaller amount of data. H.264 specifies a method for generating a chrominance-component motion vector based on a luminance-component motion vector. The motion-vector generation method differs depending on a combination of a reference-source field of a motion vector and parity (a field type indicating a top field or bottom field) of a reference-target field.

In particular, when both parities of the combination are different from each other, the chrominance-component motion vector is determined so as to specify a region above or below a position specified by the luminance-component motion vector. Thus, in this case, the region that can be specified by the chrominance-component motion vector is further extended.

In general, encoding an image with a large number of pixels requires a large amount of processing. Accordingly, one conceivable scheme is a scheme in which one picture of a moving image is divided into multiple images and the divided images are input to individual encoders for encoding. In this case, the encoders encode the input divided images independently from one another, regarding each of the images as one picture, and encoded data output from the encoders are eventually multiplexed and output. According to such processing, the encoders can be realized by encoders having low processing capabilities. Thus, for example, a manufacturing cost of an entire encoding device can be reduced in some cases.

In a such method for encoding divided images by using multiple encoders, encoding may be performed independently for each divided image. In this case, a reference image region that is accessible by one encoder is restricted to, in an already encoded image region, a region that is the same as the divided image input to the encoder. With such a system, it is possible to reduce a capacity required per memory and it is possible to further reduce the manufacturing cost.

In a system in which multiple encoders are used to encode divided images, as described above, a reference image region that is accessible by each encoder may be restricted to the same region as the input divided image. In such a system, if referring to a region outside the boundary of the input image is permitted during motion compensation, there is a possibility that an erroneous prediction image is generated during decoding.

More specifically, since each encoder regards the input divided image as an individual picture, the encoder extends the region of the reference image based on data of pixels inside the divided image to refer to a region outside the boundary of the corresponding divided image. However, when the motion vector specifies a region outside the boundary of the divided image during decoding, the decoder may extend the region of the reference image based on data of the pixels of another adjacent divided image, not the pixels inside the corresponding divided image. Consequently, an event called a "motion compensation mismatch" in which a reference image during encoding and a reference image during decoding are different from each other occurs.

In particular, with a method for generating a chrominance-component motion vector based on a luminance-component motion vector, even when the luminance-component motion vector specifies a region inside the input image, the chrominance-component motion vector can specify a region outside the boundary of the input image. Thus, when such a motion-vector generation method is applied to the above-described system using multiple encoders, the possibility of occurrence of a motion compensation mismatch increases.

In addition, when a single encoder is used to encode image data input for each divided region, a motion compensation mismatch can occur as in the case described above.

SUMMARY

An image encoding control method that controls processing for encoding data of an input moving image based on an interlace system by using a moving-image coding system that is capable of generating a chrominance-component motion vector based on a luminance-component motion vector during decoding, wherein the image encoding control method comprises: a step of sequentially receiving data of images obtained by at least vertically dividing an image in each field included in the input moving image, and receiving a luminance-component motion vector for searching for a region similar to a region to be encoded in one of the divided images from a reference image based on another divided image at the same position and a field type of the reference image referred to by the motion vector; a step of determining whether a chrominance-component motion vector generated based on the luminance-component motion specifies a reference prohibition region preset at least one of outside an upper boundary and outside a lower boundary of the reference image, for each combination of a field type of the region to be encoded and the field type of the reference image; and a step of prohibiting, when the chrominance-component motion vector generated based on the luminance-component motion vector specifies the reference prohibition region, the luminance-component motion vector from being output as a motion vector specifying a region that is most similar to the region to be encoded.

DETAILED DESCRIPTION OF THE EMBODIMENTS

Embodiments will be described below in detail with reference to the accompanying drawings.

Figure 1:
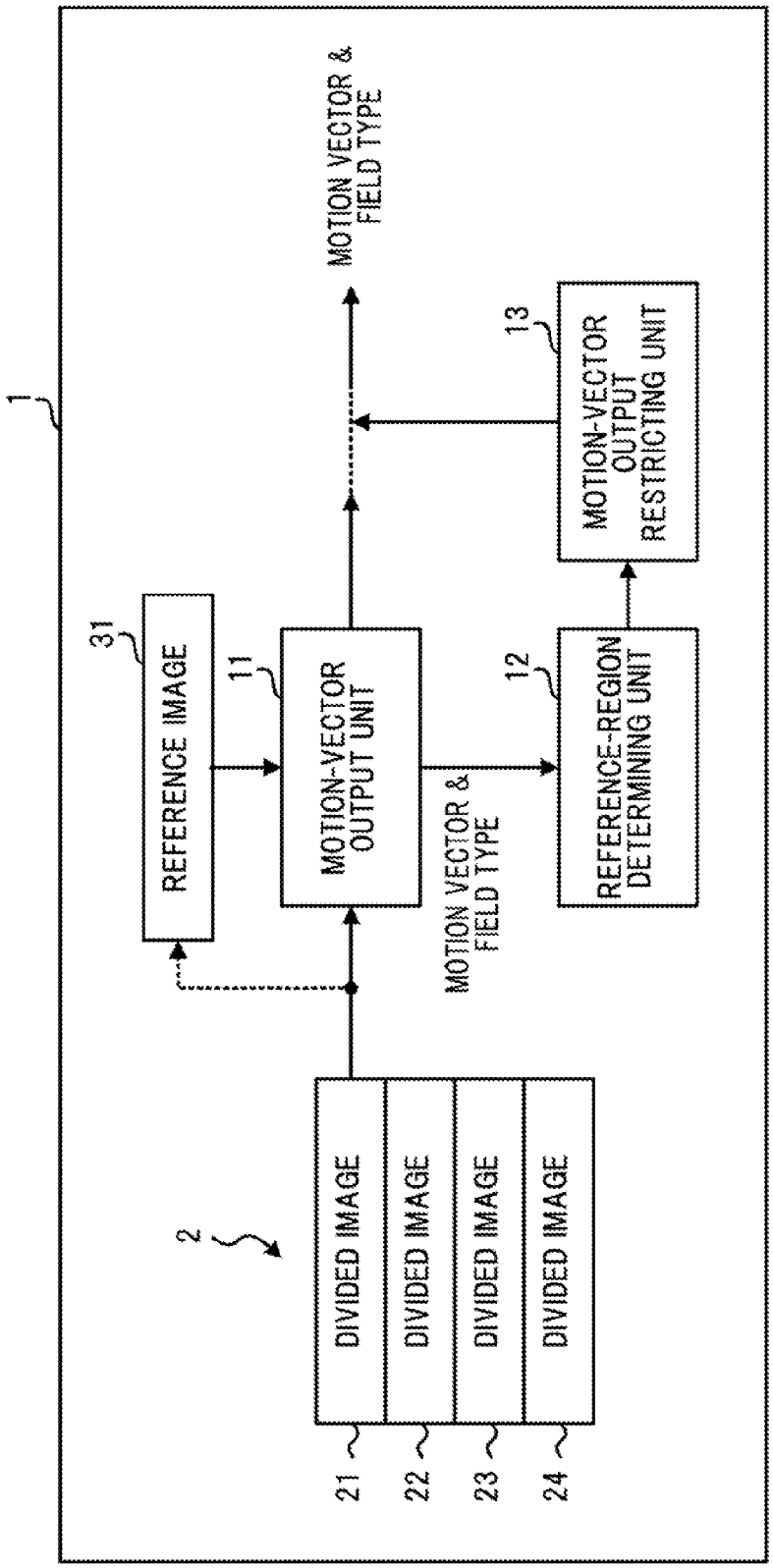
FIG. 1 is a diagram illustrating an example of the configuration of an image encoding device according to a first embodiment.

FIG. 1 is a diagram illustrating an example of the configuration of an image encoding device according to a first embodiment.

An image encoding device 1 illustrated in FIG. 1 is a device for encoding an input moving image 2 based on an interlace system. With the coding scheme used for the image encoding device 1, it is possible to generate a chrominance-component motion vector by using a specific arithmetic expression based on a luminance-component motion vector.

In addition, the image encoding device 1 encodes image data independently for individual images obtained by at least vertically dividing an image of each field included in the input moving image 2. In the example illustrated in FIG. 1, the input moving image 2 is divided into four divided images 21 to 24. The data encoded from the respective divided images is multiplexed by a multiplexer (not illustrated), so that encoded data of the input moving image 2 is generated.

The image encoding device 1 includes a motion-vector output unit 11, a reference-region determining unit 12, and a motion-vector output restricting unit 13, which function to perform encoding processing. For example, the functions of the motion-vector output unit 11, the reference-region determining unit 12, and the motion-vector output restricting unit 13 may be provided individually for each divided image so that the divided images are encoded in parallel.

The motion-vector output unit 11 receives the divided image at the same position in the input moving image 2 and outputs a motion vector for motion compensation. More specifically, the motion-vector output unit 11 outputs a luminance-component motion vector for searching for, from a reference image 31 based on another divided image at the same position, a region that is similar to a region to be encoded in the divided image. The motion-vector output unit 11 also outputs the field type of a reference image 31 referred to by the motion vector. The reference image 31 is obtained by decoding encoded data of already encoded data of divided images at the same position.

According to the image encoding device 1, in order to search for, from the reference image 31, regions that are similar to one region to be encoded, the motion-vector output unit 11 outputs multiple motion vectors (not illustrated). Of the multiple motion vectors, a motion vector specifying a region that is the most similar to the region to be encoded is output as a motion vector to be eventually encoded.

The reference-region determining unit 12 determines whether or not the chrominance-component motion vector generated in accordance with a specific arithmetic expression based on the luminance-component motion vector output from the motion-vector output unit 11 specifies a preset reference prohibition region. The reference prohibition region is set, at least, outside an upper boundary or a lower boundary of the reference image 31 for each combination of the field type of the region to be encoded and the field type of the reference image 31, the field type of the reference image 31 being output from the motion-vector output unit 11. Consequently, when the arithmetic expression for generating the chrominance-component motion vector differs for each combination of the field types, a reference prohibition region corresponding to each arithmetic expression may be set.

In the determination processing performed by the reference-region determining unit 12, for example, a chrominance-component motion vector is actually determined and a region specified by the motion vector is compared with a reference prohibition region. Alternatively, the arrangement may also be such that a reference prohibition luminance region obtained by converting a reference prohibition region by using a luminance-component motion vector is preset and a region specified by the original luminance-component motion vector is compared with the reference prohibition luminance region without determination of a chrominance-component motion vector.

Based on the result of the determination performed by the reference-region determining unit 12, the motion-vector output restricting unit 13 prohibits the luminance-component motion vector from being output from the motion-vector output unit 11 as a final motion vector specifying a region that is the most similar to the region to be encoded. The outputting is prohibited when the reference-region determining unit 12 determines that the chrominance-component motion vector generated based on the luminance-component motion vector output from the motion-vector output unit 11 specifies a reference prohibition region.

In a case in which the input moving image 2 is divided into individual images for independent encoding in the same manner as in the present embodiment, when a chrominance-component motion vector specifies a region outside the boundary of the reference image 31, there is a possibility that a reference image referred to based on the motion vector during encoding and a reference image during decoding do not match each other. Since the chrominance-component motion vector is generated from the luminance-component motion vector, the chrominance-component motion vector does not always specify a region inside the reference image 31 even when the luminance-component motion vector specifies a region inside the reference image 31.

Thus, as described above, the image encoding device 1 is adapted such that, when a reference prohibition region is set outside the boundary of the reference image 31 and it is determined that a chrominance-component motion vector based on a luminance-component motion vector specifies the reference prohibition region, the luminance-component motion vector is not eventually output. This arrangement makes it possible to reduce if not prevent an event in which the reference image during encoding and the reference image during decoding do not match each other and correct decoding is not performed.

Another embodiment will further be described in conjunction with an example of a case in which H.264 is used as a moving-image compression coding system.

Second Embodiment

Figure 2:
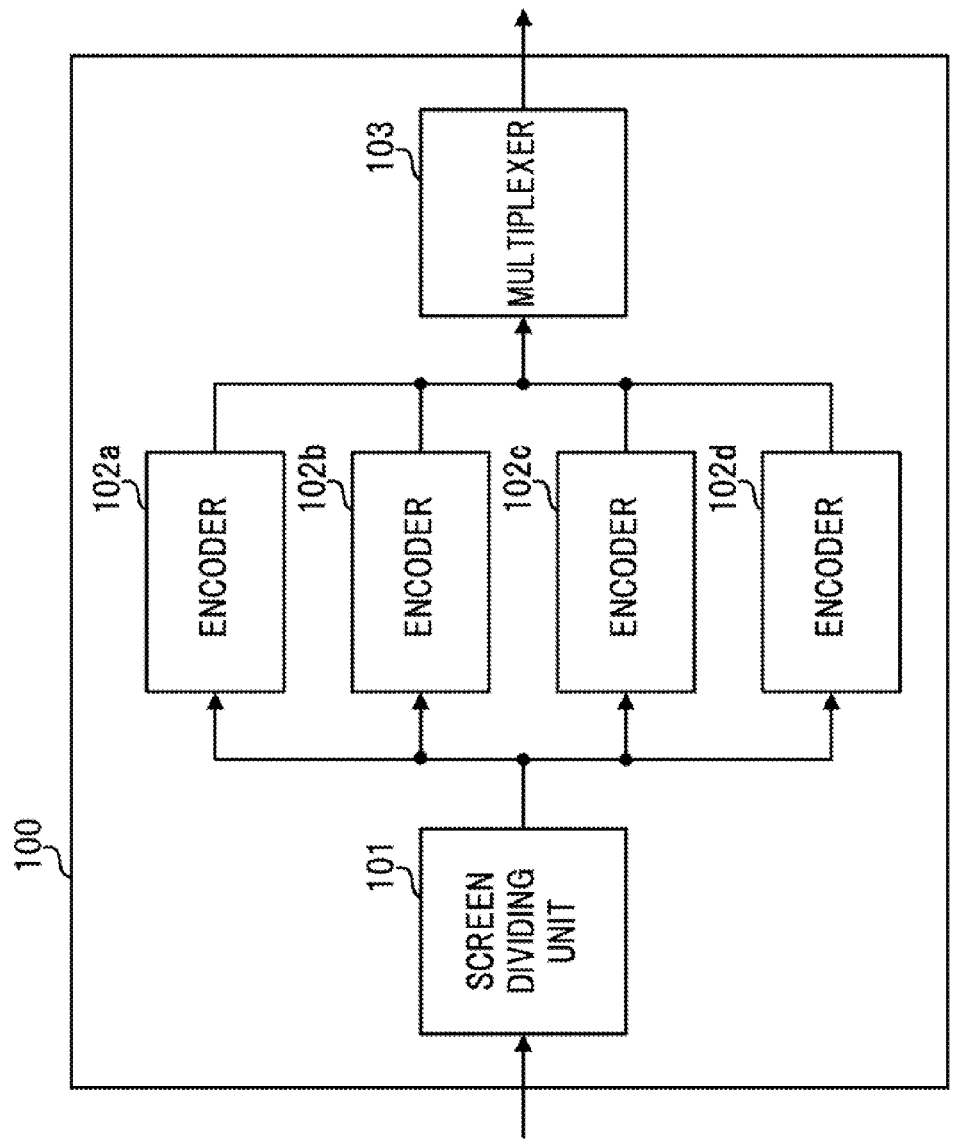
FIG. 2 is a diagram illustrating an example of the configuration of an image encoding device according to a second embodiment.

FIG. 2 is a diagram illustrating an example of the configuration of an image encoding device according to a second embodiment.

An image encoding device 100 illustrated in FIG. 2 is a device that receives input moving-image data, compresses and encodes the moving-image data, and outputs a resulting moving-image stream. The image encoding device 100 includes a screen dividing unit 101, encoders 102a to 102d, and a multiplexer 103.

The screen dividing unit 101 vertically divides one screen of an input image into multiple slices and outputs image data of the slices to the individual encoders 102a to 102d. The encoders 102a to 102d compress and encode the input slice data in accordance with an H.264 system. The number of encoders 102a to 102d provided is equal to the number of images divided by the screen dividing unit 101, and is, for example, four in the present embodiment. The multiplexer 103 multiplexes the data, encoded by the encoders 102a to 102d, to generate a single-image stream and outputs the image stream.

When the image encoding device 100 is implemented by hardware, the functions of the image encoding device 100 may be provided on, for example, one semiconductor substrate or some of the functions may be provided on discrete semiconductor substrates. For example, the image encoding device 100 may be configured so that the encoders 102a to 102d are implemented by discrete semiconductor integrated circuits and the semiconductor integrated circuits are coupled with another semiconductor integrated circuit including the screen dividing unit 101 and the multiplexer 103.

Figure 3:
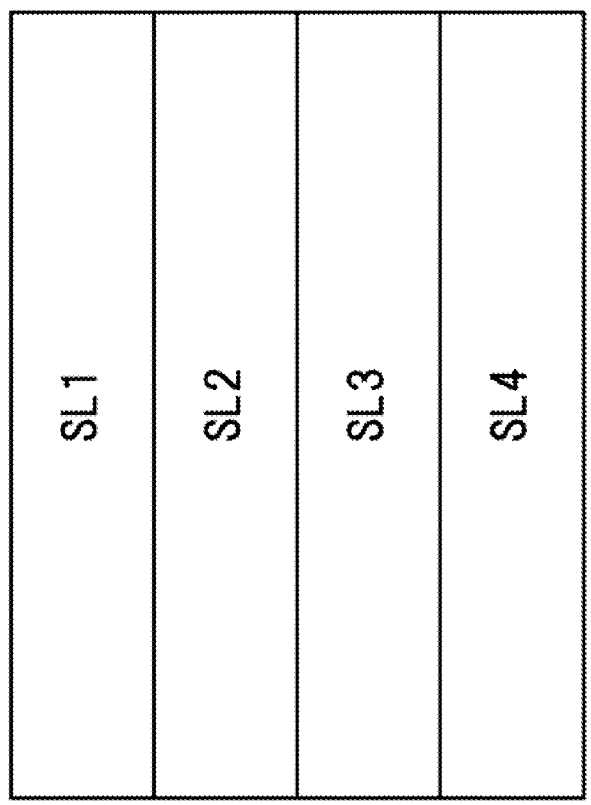
FIG. 3 illustrates an example of images divided by a screen dividing unit.

FIG. 3 illustrates one example of images divided by the screen dividing unit.

In the embodiment, the screen dividing unit 101 vertically divides an input image into, for example, four slices SL1 to SL4, as illustrated in FIG. 3. The area (the number of pixels) of the slice SL1 and the area of the slice SL4 may be equal to each other. The encoders 102a, 102b, 102c, and 102d compress and encode the slices SL1, SL2, SL3, and SL4, respectively.

With this arrangement, there is no need for each of the encoders 102a to 102d to have a capability of encoding an image for one screen input to the screen dividing unit 101. Thus, for example, when the encoders 102a to 102d are implemented as discrete circuits, relatively low-cost circuits having a low processing capability may be used as the circuits.

Figure 4:
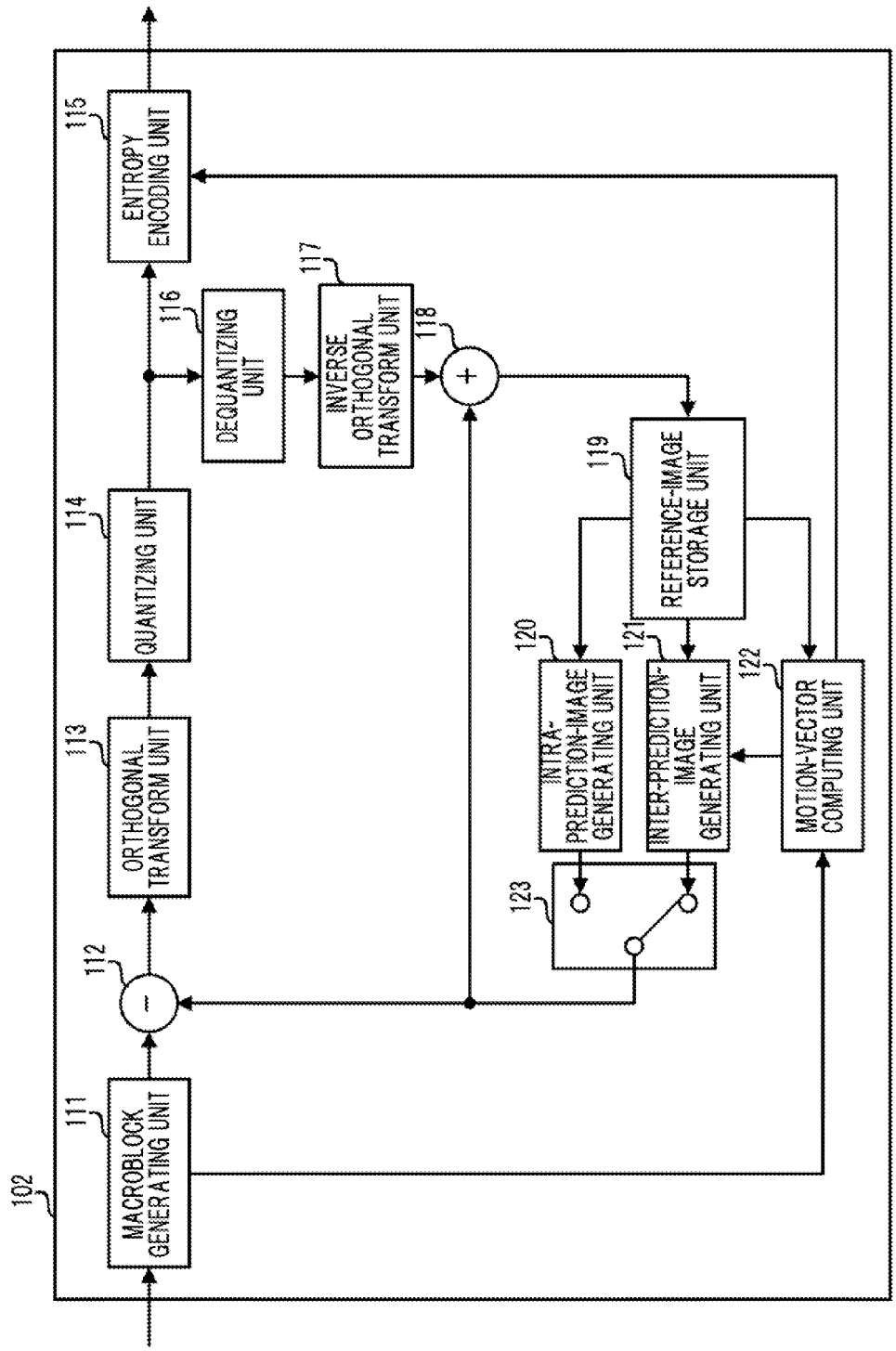
FIG. 4 is a diagram illustrating an example of the internal configuration of an encoder.

FIG. 4 is a diagram illustrating an example of the internal configuration of an encoder. The encoders 102a to 102d illustrated in FIG. 2 may have the same basic configuration. Thus, in the following description, the encoders 102a to 102d are collectively referred to as an "encoder 102".

The encoder 102 includes a macroblock (MB) generating unit 111, a prediction-error-signal generating unit 112, an orthogonal transform unit 113, a quantizing unit 114, an entropy encoding unit 115, a dequantizing unit 116, an inverse orthogonal transform unit 117, a reference-image generating unit 118, a reference-image storage unit 119, an intra-prediction-image generating unit 120, an inter-prediction-image generating unit 121, a motion-vector computing unit 122, and a prediction-image selecting unit 123.

The macroblock generating unit 111 divides an input slice into macroblocks, each having 16×16 pixels, and outputs the macroblocks to the prediction-error-signal generating unit 112 and the motion-vector computing unit 122. Image data for each macroblock is hereinafter referred to as "block data".

The prediction-error-signal generating unit 112 generates prediction error signals by determining a difference between the block data output from the macroblock generating unit 111 and data of the prediction image output from the prediction-image selecting unit 123. The orthogonal transform unit 113 orthogonally transforms the prediction error signals, output from the prediction-error-signal generating unit 112, into signals having frequency components decomposed in the horizontal and vertical directions and outputs the signals. The quantizing unit 114 quantizes the signals, output from the orthogonal transform unit 113, and outputs quantized data. With this arrangement, the amount of code of the prediction error signals is reduced.

The entropy encoding unit 115 performs entropy encoding on the quantized data output from the quantizing unit 114 and outputs encoded image data. The "entropy encoding" as used herein refers to a coding scheme for assigning variable length code in accordance with the probability of symbol occurrence.

The dequantizing unit 116 dequantizes the quantized data output from the quantizing unit 114. The inverse orthogonal transform unit 117 performs inverse orthogonal transform processing on data output from the dequantizing unit 116. Consequently, signals that are substantially equivalent to the pre-encoding prediction error signals are obtained.

The reference-image generating unit 118 adds block data motion-compensated by the inter-prediction-image generating unit 121 and the prediction error signals decoded by the dequantizing unit 116 and the inverse orthogonal transform unit 117. As a result, block data of a motion-compensated reference image is generated and is stored in the reference-image storage unit 119.

The intra-prediction-image generating unit 120 generates prediction-image block data from already encoded neighborhood pixels in the same picture (the slice in this case). The inter-prediction-image generating unit 121 performs motion compensation on the reference-image data read from the reference-image storage unit 119 by using a motion vector, output from the motion-vector computing unit 122, to generate block data of a motion-compensated prediction image.

The motion-vector computing unit 122 computes a motion vector based on the current image block data output from the macroblock generating unit 111 and the reference-image data read from the reference-image storage unit 119. The motion vector is a value indicating, for each block, the amount of spatial movement (shift) between an original image and a reference image, and is determined using a block matching technology for searching for, for each block, a position that is the most similar to a current image from a reference image.

The prediction-image selecting unit 123 selects the prediction image output from one of the intra-prediction-image generating unit 120 and the inter-prediction-image generating unit 121, and outputs the selected prediction image to the prediction-error-signal generating unit 112 and the reference-image generating unit 118.

Next, a description will be given of a method in which the motion-vector computing unit 122 in the encoder 102 restricts a region to be specified by a luminance-component motion vector. In the following description, a region that prohibits being specified by a motion vector is referred to as a "reference prohibition region".

In the encoder 102, a reference image is decoded in the process of encoding processing and the data of the reference image is stored in the reference-image storage unit 119. As the reference-image storage unit 119, for example, an individual storage circuit may be provided in each of the encoders 102a to 102d illustrated in FIG. 2, or a single storage circuit may be shared by the encoders 102a to 102d. In either case, however, the storage regions of the reference-image storage unit 119 which are provided for the encoders 102a to 102d are independent from each other. Each of the encoders 102a to 102d may not access the storage areas of the other encoders. Thus, the encoders 102a to 102d execute encoding processing on the input slices independently from one another, regarding the slices as independent pictures.

In H.264, during motion compensation, a region specified by a motion vector is permitted to be outside the boundary of the region of an input image. In other words, in H.264, it is possible to perform motion compensation by referring to a region located outside the boundary of an input image. When a region specified by a motion vector is outside the boundary of an input image, the inter-prediction-image generating unit 121 extends the reference image based on, out of the reference-image data stored in the reference-image storage unit 119, data of pixels in the vicinity of the boundary of the reference image. Data of the pixels in the extended region is output as prediction values.

Coordinates (x', y') of a pixel in the extended region are, for example, determined by:

$$x'=\min(\max(x+dx,0),h\_size-1) \quad (1)$$

$$y'=\min(\max(y+dy,0),v\_size-1) \quad (2)$$

where x and y indicate coordinates of a pixel to be encoded, dx and dy indicate a motion vector of the pixel to be encoded, h_size and v_size respectively indicate the number of horizontal pixels and the number of vertical pixels in the image to be encoded, min (j, k) indicates an operator for outputting the smaller one of the values of j and k, and max (j, k) indicates an operator for outputting the larger one of the values of j and k. Data determined from expressions (1) and (2) are output as data of the pixel in the extended region referred to by a motion vector.

Figure 5:
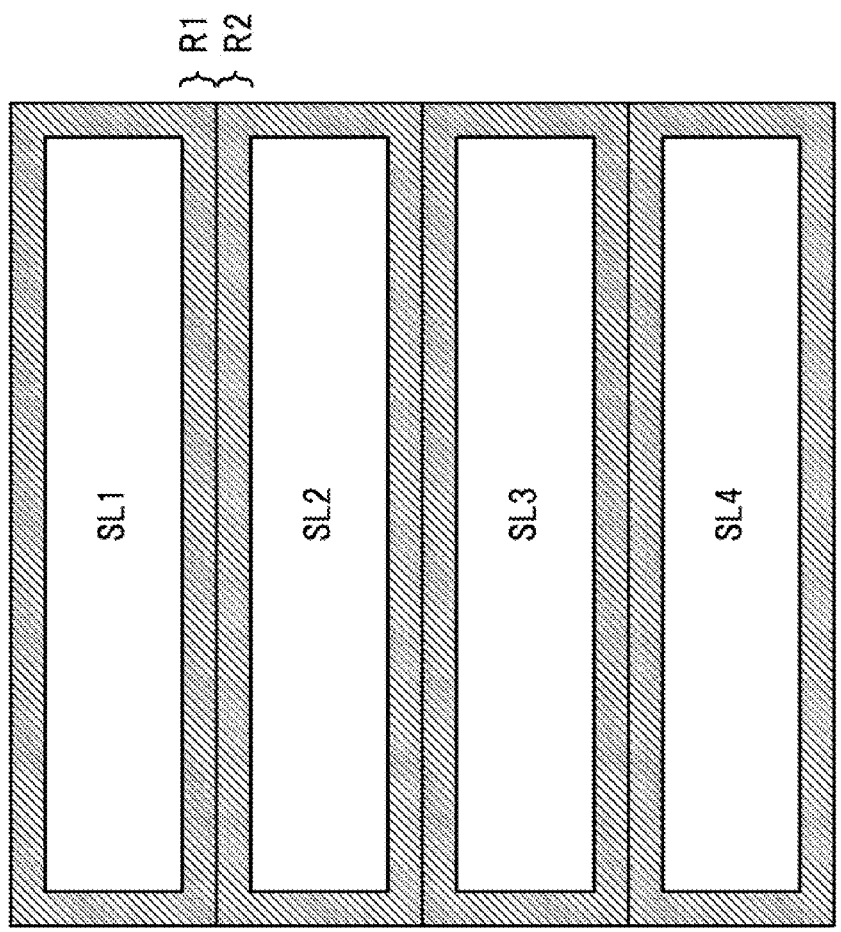
FIG. 5 illustrates extension of reference images.

FIG. 5 illustrates extension of reference images.

The encoders 102a to 102d perform encoding processing on the input slices SL1 to SL4 independently from one another, regarding each of the input slices SL1 to SL4 as one picture. Thus, data of a reference image corresponding to the same region as the slice SL1 is stored in the reference-image storage unit 119 provided in the encoder 102a. Similarly, data of a reference image corresponding to the same region as the slice SL2 is stored in the reference-image storage unit 119 provided in the encoder 102b. Data of a reference image corresponding to the same region as the slice SL3 is stored in the reference-image storage unit 119 provided in the encoder 102c. Data of a reference image corresponding to the same region as the slice SL4 is stored in the reference-image storage unit 119 provided in the encoder 102d.

It is assumed that, during motion compensation performed by the encoders 102a to 102d, motion vectors specify regions outside the boundaries of the regions of the input images. In this case, the inter-prediction-image generating units 121 in the encoders 102a to 102d extend the regions of the reference images to regions outside the boundaries of the input slices SL1 to SL4 and generate data of prediction images based on data of the extended reference images.

In FIG. 5, the regions extended from the slices SL1 to SL4 are illustrated by hatching. For example, the inter-prediction-image generating unit 121 in the encoder 102a may output, as data of the prediction image, data of the extended region around the four sides of the slice SL1, based on the data inside the boundary of the reference image corresponding to the region of the slice SL1. Similarly, for example, the inter-prediction-image generating unit 121 in the encoder 102b may output, as data of the prediction image, data of the extended regions around the four sides of the slice SL2, based on the data inside the boundary of the reference image corresponding to the region of the slice SL2.

However, when a prediction image is generated using such a technique, a motion compensation mismatch may occur during decoding, e.g., a reference image that is different from a reference image during the encoding may be generated during decoding. Such an event occurs when a region between adjacent slices is specified by a motion vector.

For example, when the motion vector specifies a region R1 below the slice SL1 during motion compensation performed by the encoder 102a, data of the region R1 is generated based on the data of the reference image corresponding to the region of the slice SL1. On the other hand, when image data encoded by the image encoding device 100 having the above-described configuration is decoded, there is a possibility that prediction values of the region R1 are generated based on the data of the region of the adjacent slice SL2. In such a case, a motion compensation mismatch occurs and a correct image may not be decoded.

For example, when the motion vector specifies a region R2 above the slice SL2 during motion compensation performed by the encoder 102b, data of the region R2 is generated based on data of the reference image corresponding to the region of the slice SL2. On the other hand, when image data encoded by the image encoding device 100 having the above-described configuration is decoded, there is a possibility that prediction values of the region R2 are generated based on the data of the region of the adjacent slice SL1. In such a case, a motion compensation mismatch occurs and a correct image may not be decoded.

Figure 6:
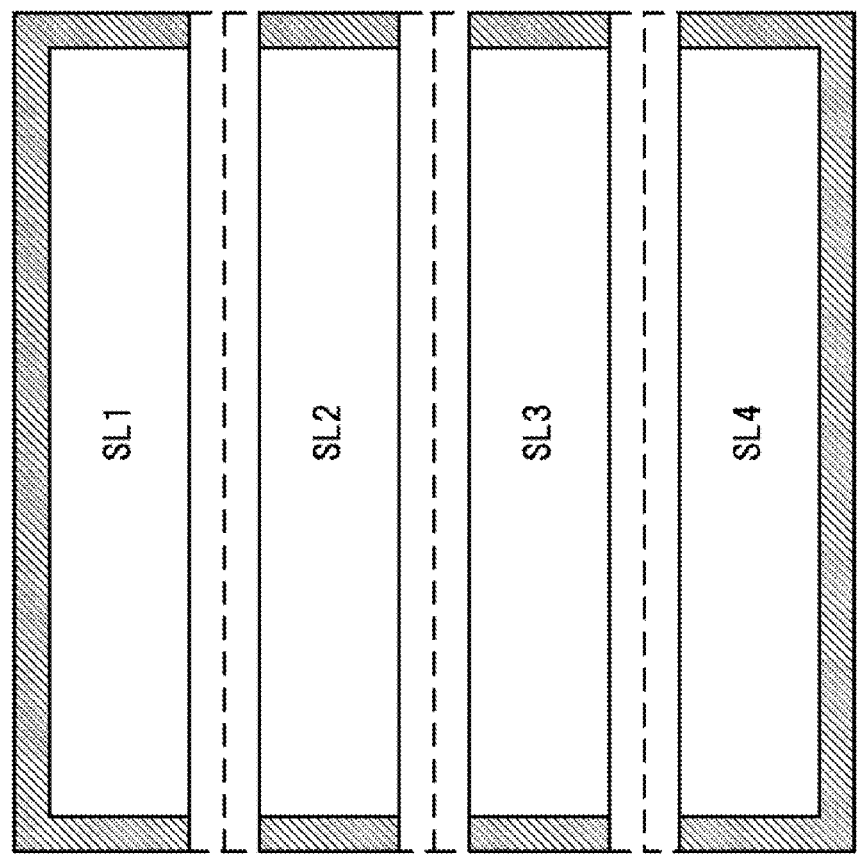
FIG. 6 illustrates extension of reference images when regions to be specified by motion vectors are restricted.

FIG. 6 illustrates extension of reference images when regions to be specified by motion vectors are restricted.

In order to prevent occurrence of a motion compensation mismatch as described above, the encoders 102a to 102d restrict regions to be specified by motion vectors during motion compensation, as illustrated in FIG. 6, so that the extended regions between the slices are not specified. For example, the encoder 102a sets, as a reference prohibition region, a region below the region corresponding to the slice SL1. The encoder 102b also sets, as reference prohibition regions, both regions above and below the region corresponding to the slice SL2. The encoder 102c sets, as reference prohibition regions, both regions above and below the region corresponding to the slice SL3. The encoder 102d sets, as a reference prohibition region, a region corresponding to the region above the slice SL4.

In order to execute such processing, at least the encoders 102b and 102c may have the same configuration. However, the encoders 102a and 102d may also set, as reference prohibition regions, both regions above and below regions corresponding to the slices SL1 and SL4, respectively, as in the case of the encoders 102b and 102c. Such an arrangement makes it possible to employ the same configuration for all of the encoders 102a to 102d and also makes it possible to reduce the manufacturing cost of the image encoding device 100.

Figure 7:
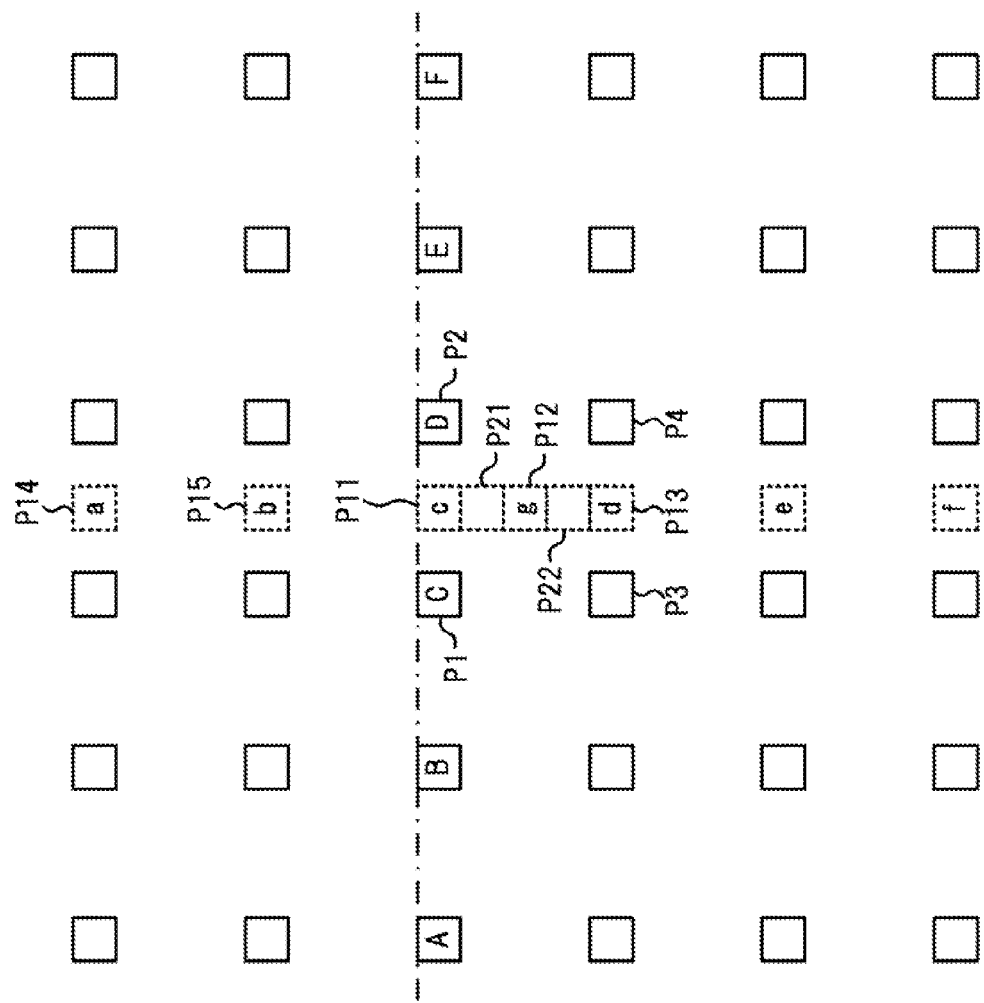
FIG. 7 illustrates motion compensation with sub-pixel accuracy.

FIG. 7 illustrates motion compensation with sub-pixel accuracy.

In H.264, it is possible to perform motion compensation with sub-pixel accuracy, such as ½ pixel accuracy and ¼ pixel accuracy. When such a sub-pixel is specified by a motion vector, data of the sub-pixel is computed by filter computation based on data of integer pixels in the vicinity of the sub-pixel.

However, when a sub-pixel is specified by a motion vector, data of pixels outside the boundary of a slice may be used in the process of computation of pixel data even when the specified sub-pixel is located inside the boundary of the slice. Thus, as described above, when the encoders 102a to 102d perform encoding processing independently from one another, a motion compensation mismatch may occur.

In FIG. 7, integer pixels included in a reference image are represented by solid lines and sub-pixels that may be set between the integer pixels are represented by dotted lines. Characters in the pixels represent data in the pixels. As an example of a ½ pixel, a sub-pixel P11 located at a midpoint between integer pixels P1 and P2 may be specified by a motion vector. Data of the sub-pixel P11 may be determined using a six-tap filter based on data of six integer pixels that are horizontally parallel to each other across the sub-pixel P11. When the filter coefficients are (1, −5, 20, 20, −5, 1), data "c" of the sub-pixel P11 is determined by:

$$c1 = A - 5*B + 20*C + 20*D - 5*E + F \quad (3)$$

$$c = (c1 + 16) >> 5 \quad (4)$$

In expression (4), ">>X" is an operator expressing a bit shift to the right by X bits.

As another example of a ½ pixel, a sub-pixel P12 located at a midpoint between integer pixels P1, P2, P3, and P4 may be specified by a motion vector. Data "g" of the sub-pixel P12 may be determined by:

$$g1 = a - 5*b + 20*c1 + 20*d1 - 5*e + f \quad (5)$$

$$g = (g1 + 512) >> 10 \quad (6)$$

In expression (5), data d1 is determined by a computational method that is analogous to the computational method for the data c1, based on data of six integer pixels that are horizontally parallel to each other across a sub-pixel P13. Data "a" and "b" are determined by a computational method that is analogous to the computational method for the data "c," based on data of six integer pixels that are horizontally parallel to each other across corresponding sub-pixels P14 and P15.

It is now assumed that a row in which the integer pixels P1 and P2 are arranged is the uppermost row in the reference image stored in the reference-image storage unit 119. In this case, when the sub-pixel P11 or P12 is specified by a motion vector, data of integer pixels outside the boundary of the reference image are used in order to compute data of the specified pixel. When the encoders 102a to 102d perform encoding processing independently from one another, data of the integer pixels outside the boundary of the reference image are generated based on data of the pixels inside the boundary.

As an example of a ¼ pixel, a sub-pixel P21 located at a midpoint between the sub-pixels P11 and P12 may be specified by a motion vector. Alternatively, a sub-pixel P22 located at a midpoint between the sub-pixels P12 and P13 may be specified by a motion vector. Data of each of the sub-pixels P21 and P22 are computed based on data of six ½ pixels that are vertically parallel to each other across the corresponding sub-pixel. Thus, when the row in which the integer pixels P1 and P2 are arranged is the uppermost row in the reference image, even when the sub-pixel P21 or P22 is specified by a motion vector, data of integer pixels outside the boundary of the reference image are used to compute data of the specified sub-pixel. When the encoders 102a to 102d perform encoding processing independently from one another, data of the integer pixels outside the boundary of the reference image are generated based on data of the reference image corresponding to the region inside the boundary.

However, when data of pixels outside the boundary of the reference image are used in the process of encoding processing, as in the examples described above, a reference image that is different from a reference image during encoding may be generated during decoding. For example, data of a reference image corresponding to the slice above the row including the integer pixels P1 and P2 may be used during decoding in order to determine data of the sub-pixel P12, P21, or P22. In this case, a motion compensation mismatch occurs.

In order to reduce if not prevent such an event, the encoders 102a to 102d restrict regions to be specified by motion vectors during motion compensation so that specific regions that are close to the boundaries of regions corresponding to the input slices are not specified.

Figure 8:
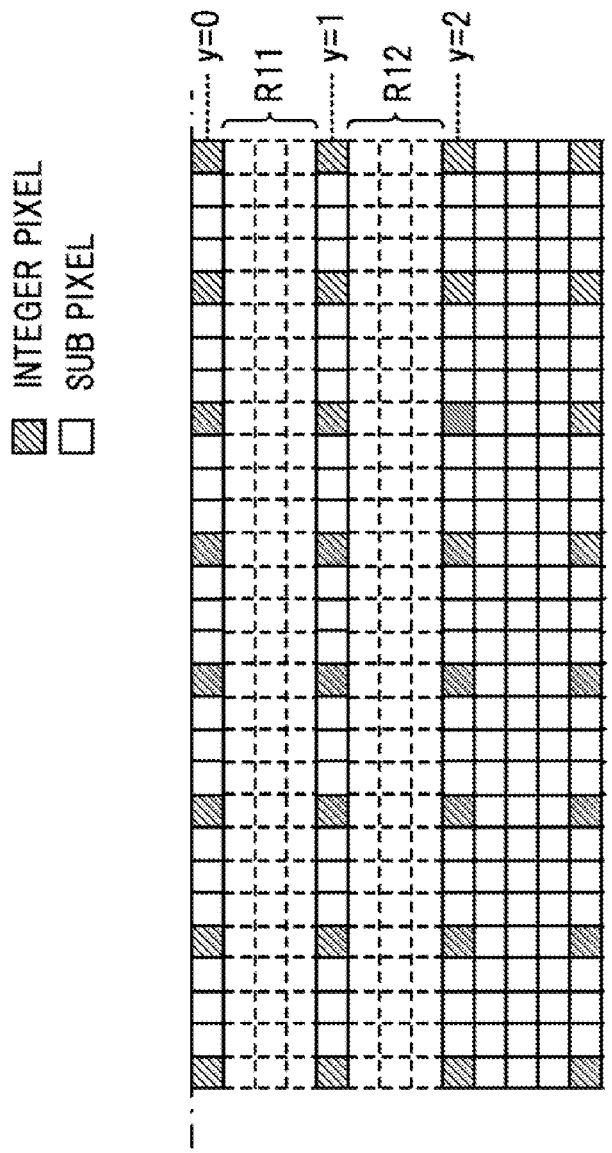
FIG. 8 illustrates reference prohibition regions at the upper edge of the reference image.

FIG. 8 illustrates reference prohibition regions at the upper edge of a reference image.

FIG. 8 illustrates a region in the vicinity of the upper edge of the reference image stored in the reference-image storage unit 119. The dashed-dotted line illustrated in FIG. 8 represents an upper screen boundary of the reference image. At least, the encoders 102b to 102d set, as reference prohibition regions, regions above regions corresponding to the input slices, as described above with reference to FIG. 6.

With respect to the region of the reference image stored in the reference-image storage unit 119, each of the encoders 102b and 102d further sets, as reference prohibition regions, regions between adjacent rows located between a row of y=0 corresponding to the upper edge and a row of y=n (where n is an integer of 1 or greater). For example, when data of a sub-pixel is computed using a 6-tap filter in the same manner as in the present embodiment, n is 2. Thus, as illustrated in FIG. 8, a sub-pixel region R11 between the row of y=0 and the row of y=1 in the reference image and a sub-pixel region R12 between the row of y=1 and the row of y=2 are set as reference prohibition regions. With this arrangement, a motion compensation mismatch is reduced if not prevented.

Figure 9:
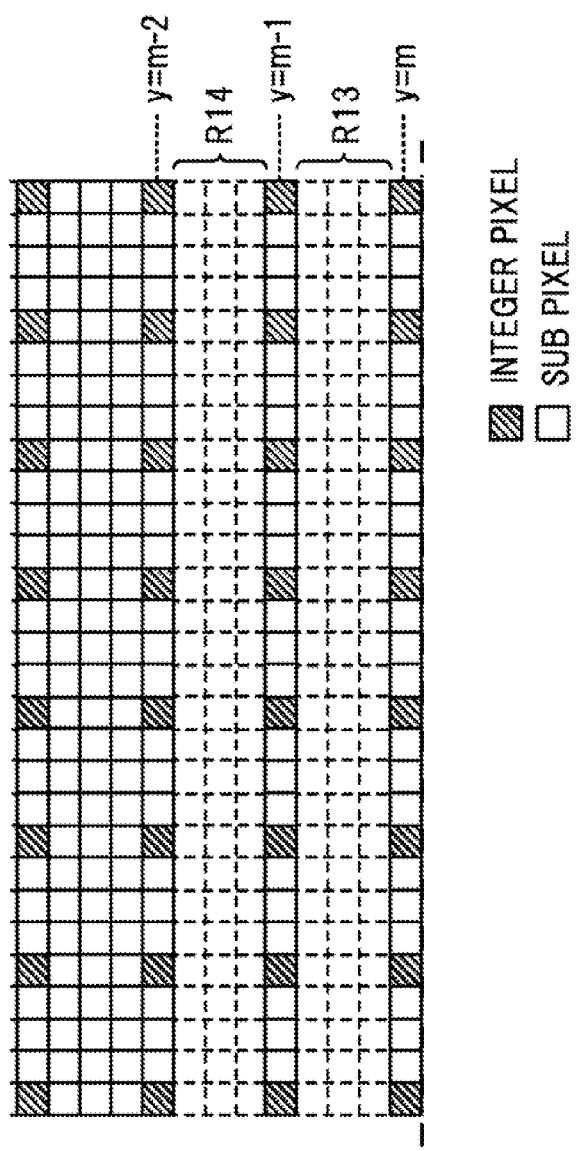
FIG. 9 illustrates reference prohibition regions at the lower edge of the reference image.

FIG. 9 illustrates reference prohibition regions at the lower edge of a reference image.

FIG. 9 illustrates a region in the vicinity of the lower edge of the reference image stored in the reference-image storage unit 119. The dashed-dotted line illustrated in FIG. 9 represents a lower screen boundary of the reference image. At least, the encoders 102a to 102c set, as reference prohibition regions, regions below regions corresponding to the input slices, as described above with reference to FIG. 6.

It is assumed in this case that the input slice has m+1 integer pixels between y=0 to y=m in the vertical direction. In this case, with respect to the region of the reference image stored in the reference-image storage units 119, each of the encoders 102b to 102d further sets, as reference prohibition regions, regions between adjacent rows located between a row of y=m corresponding to the lower edge and a row of y=m−n. For example, when data of a sub-pixel is computed using a 6-tap filter in the same manner as in the present embodiment, n is 2. Thus, as illustrated in FIG. 9, a sub-pixel region R13 between the row of y=m and the row of y=m−1 in the reference image and a sub-pixel region R14 between the row of y=m−1 and the row of y=m−2 are set as reference prohibition regions. With this arrangement, a motion compensation mismatch is reduced if not prevented.

In order to employ the same configuration for the encoders 102a to 102d, all of the encoders 102a to 102d may set the regions R11 to R14 as reference prohibition regions.

Next, a description will be given of a method for generating a chrominance-component motion vector in H.264. In the following description, a luminance-component motion vector is referred to as a "luminance vector" and a chrominance-component motion vector is referred to as a "chrominance vector".

H.264 specifies a method for generating chrominance vectors based on luminance vectors during decoding with respect to moving images according to an interlace system. In the specification H.264, a method for computing vertical components of chrominance vectors varies depending on a combination of parity (a field type) of an image region to be encoded (hereinafter referred to as a "reference-source field") and parity of an image region referred to (hereinafter referred to as a "reference-target field").

When the parity of the reference-source field and the parity of the reference-target field are the same, a vertical component MVCy of a chrominance vector is determined by expression (7) below based on a vertical component MVy of a luminance vector.

$$MVCy = MVy/2 \quad (7)$$

When the parity of the reference-source field and the parity of the reference-target field are different from each other, a chrominance vector is determined by two types of a computation method below depending on the combination of the parities. When the reference-source field is a top field and the reference-target field is a bottom field, the vertical component MVCy of a chrominance vector is determined by:

$$MVCy = (MVy/2) - (¼) \quad (8)$$

When the reference-source field is a bottom field and the reference-target field is a top field, the vertical component MVCy of a chrominance vector is determined by:

$$MVCy = (MVy/2) + (¼) \quad (9)$$

Figure 10:
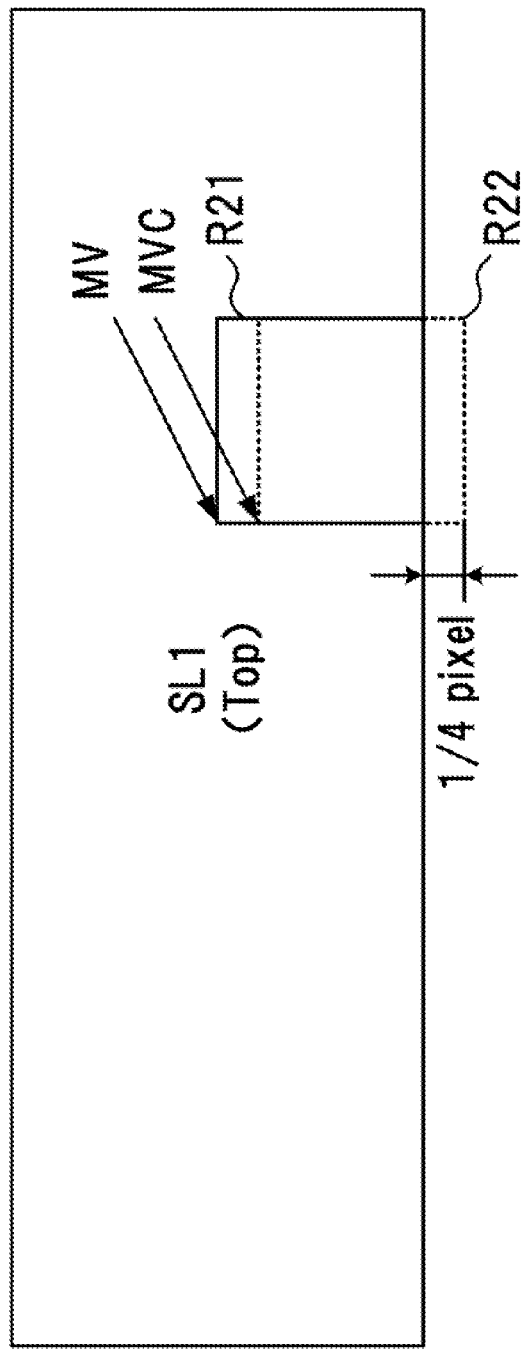
FIG. 10 illustrates a region referred to by a chrominance vector.

FIG. 10 illustrates a region referred to by a chrominance vector.

In FIG. 10, in a reference image corresponding to the slice SL1, a region referred to by the motion vector is illustrated as one example. It is assumed that the parity of a macroblock to be encoded is a bottom field and the parity of the reference image is a top field. In this case, a vertical component of a chrominance vector is determined by expression (9) noted above.

It is assumed that, in FIG. 10, a luminance vector MV is determined during encoding of a macroblock at a given position in the image to be encoded. In this case, in the reference image, a region R21 represented by a solid line is referred to by the luminance vector MV. A chrominance vector MVC is determined as a vector shifted downward by a ¼ pixel from the luminance vector MV in accordance with expression (9) noted above. In this case, in the reference image, a region R22 denoted by a dotted line is referred to by the chrominance vector MVC.

In this case, as in the example of FIG. 10, when the region R21 referred to by the luminance vector MV is present in the vicinity of the lower edge of the reference image, the region R22 referred to by the chrominance vector MVC may include a region outside the boundary of the reference image. When the region referred to by the chrominance vector MVC is located outside the boundary of the reference image, data obtained by extending the circumference of the reference image based on data inside the boundary of the reference image is output as data of a prediction image, as in the case of the above-described luminance vector.

However, in the encoder 102a for encoding the slice SL1, when a region below the boundary of the reference image is referred to by a chrominance vector, a motion compensation mismatch may occur as in the case of the luminance vector. This is also true for the encoders 102b and 102c.

On the other hand, when the parity of a macroblock to be encoded is a top field and the parity of a reference image is a bottom field, a vertical component of a chrominance vector is determined by expression (8) noted above. In this case, even when a region inside the boundary of the reference image is referred to by a luminance vector, a region above the boundary of the reference image may be referred to by a chrominance vector. In the encoders 102a to 102c, when a region above the boundary of the reference image is referred to by a chrominance vector, a motion compensation mismatch may occur as in the case of the luminance vector.

Accordingly, in accordance with a combination of the parity of a macroblock to be encoded and the parity of a reference image, each of the encoders 102a to 102d restricts outputting of a luminance vector so that a region above or below the boundary of the reference image is not referred to by a chrominance vector. This arrangement reduces if not prevents occurrence of a motion compensation mismatch during motion compensation of a chrominance component.

Next, a description will be given of a specific configuration of the motion-vector computing unit 122 having a motion-vector output restricting function as described above.

Figure 11:
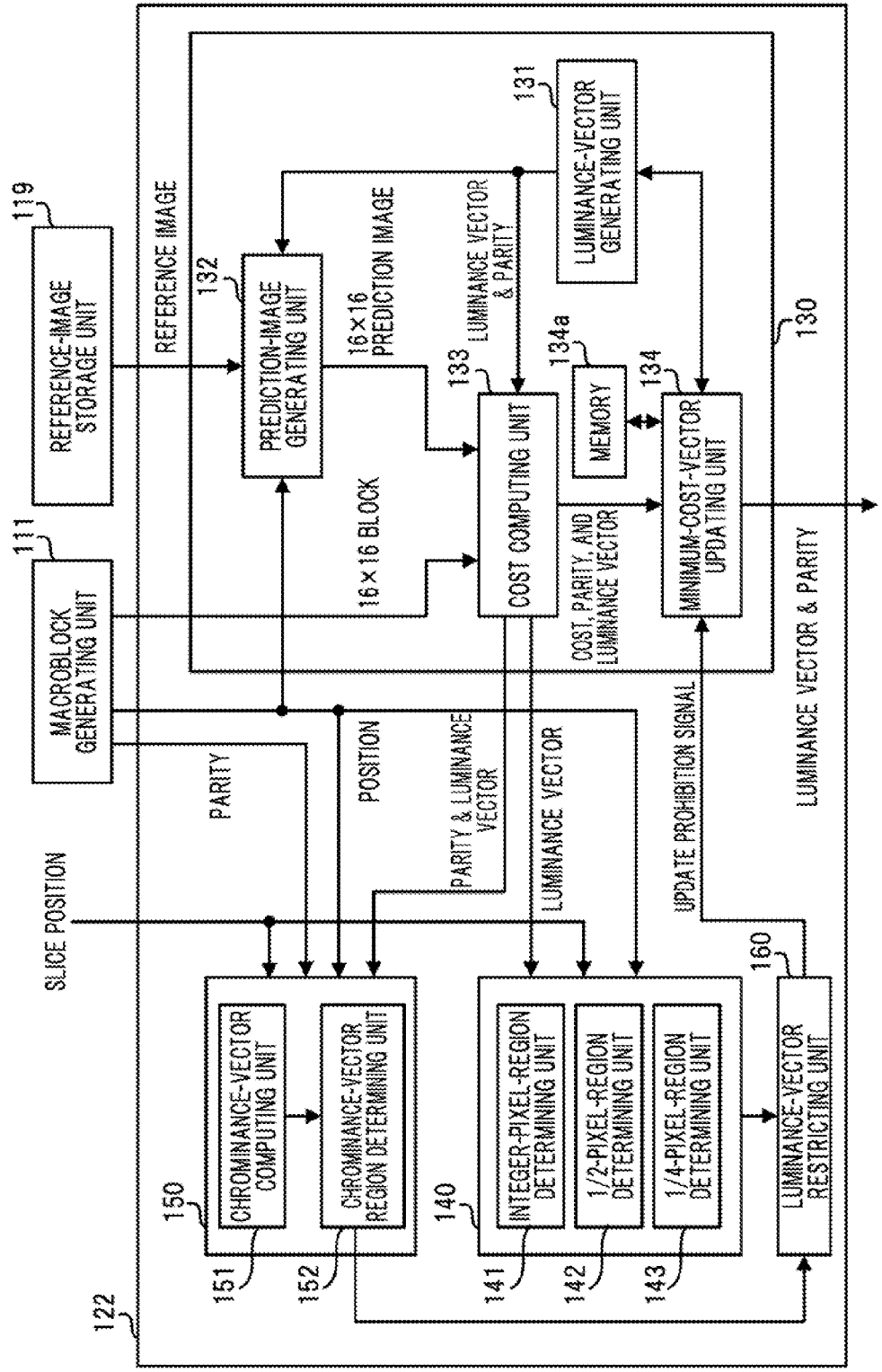
FIG. 11 is a diagram illustrating an example of the internal configuration of a motion-vector computing unit.

FIG. 11 is a diagram illustrating an example of the internal configuration of the motion-vector computing unit.

The motion-vector computing unit 122 includes a luminance-vector output unit 130, a luminance-vector determining unit 140, a chrominance-vector determining unit 150, and a luminance-vector restricting unit 160.

The luminance-vector output unit 130 receives, from the macroblock generating unit 111, a macroblock to be encoded (hereinafter referred to as a "reference-source block") and the position of the macroblock. The luminance-vector output unit 130 then searches for, from the reference image stored in the reference-image storage unit 119, image regions similar to the reference-source block, and outputs a luminance vector specifying an image region that is the most similar to the reference-source block. In order to perform such processing, the luminance-vector output unit 130 includes a luminance-vector generating unit 131, a prediction-image generating unit 132, a cost computing unit 133, and a minimum-cost-vector updating unit 134.

The luminance-vector generating unit 131 specifies a reference position in a reference image from which the image region similar to the reference-source block is to be searched for. More specifically, the luminance-vector generating unit 131 specifies parity of the reference-target reference image and also outputs a luminance vector indicating the reference-target position relative to the position of the reference source block. In the present embodiment, a position at a minimum of a ¼ pixel may be specified by the luminance vector.

The prediction-image generating unit 132 reads, from the reference-image data stored in the reference-image storage unit 119, data of parity specified as a reference target by the luminance-vector generating unit 131. The prediction-image generating unit 132 determines a reference position in the reference image based on the position of the reference-source block and the luminance vector output from the luminance-vector generating unit 131 and generates a prediction image corresponding to the reference position from the reference image. The prediction image has a size of 16×16 pixels, which is the same as the reference-source block. For example, when a sub-pixel region is specified by a luminance vector or when a region outside the boundary of the reference image is specified by a luminance vector, the prediction-image generating unit 132 executes reference-image region extension processing, filter computation, and so on.

The cost computing unit 133 computes a cost indicating a similarity between the prediction image generated by the prediction-image generating unit 132 and the reference-source block. The cost CST is computed as the sum of absolute values of differences between data Curr_Pix of pixels in the reference-source block and data Pred_Pix of pixels in the prediction image, as expressed by:

$$CST = \Sigma |Curr\_Pix - Pred\_Pix| \qquad (10).$$

The cost computing unit 133 outputs the computed cost, together with the luminance vector and the parity received from the luminance-vector generating unit 131, to the minimum-cost-vector updating unit 134. The cost computing unit 133 outputs the luminance vector to the luminance-vector determining unit 140 and the chrominance-vector determining unit 150, and also outputs the parity to the chrominance-vector determining unit 150.

The minimum-cost-vector updating unit 134 holds, in a memory 134a, a minimum value of the costs sequentially output from the cost computing unit 133 and also holds, in the memory 134a, the luminance vector and the parity when the cost has the minimum value. However, upon receiving an update prohibition signal from the luminance-vector restricting unit 160, the minimum-cost-vector updating unit 134 does not update the held information, even when the cost received from the cost computing unit 133 has the minimum value.

In order to reduce or prevent occurrence of a motion compensation mismatch, the luminance-vector determining unit 140, the chrominance-vector determining unit 150, and the luminance-vector restricting unit 160 are provided so as to restrict a luminance vector output from the luminance-vector output unit 130. The luminance-vector determining unit 140 is to reduce or prevent occurrence of a motion compensation mismatch in an MPEG-4 system except the H.264 system, that is, is to reduce or prevent occurrence of a motion compensation mismatch caused by a luminance vector specifying a sub-pixel outside or in the vicinity of the boundary of the input image. The chrominance-vector determining unit 150 is to reduce or prevent occurrence of a motion compensation mismatch in the H.264 system, that is, is to reduce or prevent occurrence of a motion compensation mismatch caused by generation of a chrominance vector based on a luminance vector. With such a configuration having the additional function for preventing motion compensation mismatch in the H.264 system, it is also possible to handle the H.264 system while minimizing changes made to the configuration of the motion-vector computing unit 122 that handles the MPEG-4 system.

The luminance-vector determining unit 140 receives a luminance vector indicating the current reference target from the cost computing unit 133 and also receives the position of the macroblock to be encoded from the macroblock generating unit 111. Based on information of the luminance vector and the position of the macroblock, the luminance-vector determining unit 140 determines whether or not the luminance vector indicating the current reference target specifies the reference prohibition region described in FIGS. 6, 8, and 9. The luminance-vector determining unit 140 then outputs a determination flag indicating the result of the determination to the luminance-vector restricting unit 160. In this case, when the luminance vector specifies a reference prohibition region, the determination flag is set to "1".

In the present embodiment, the luminance-vector determining unit 140 includes an integer-pixel-region determining unit 141, a ½-pixel-region determining unit 142, and a ¼-pixel-region determining unit 143. When searching in units of an integer pixel is performed according to a luminance vector, the integer-pixel-region determining unit 141 determines whether or not the luminance vector specifies a reference prohibition region. When searching in units of a ½ pixel is performed according to a luminance vector, the ½-pixel-region determining unit 142 determines whether or not the luminance vector specifies a reference prohibition region. When searching in units of a ¼ pixel is performed according to a luminance vector, the ¼-pixel-region determining unit 143 determines whether or not the luminance vector specifies a reference prohibition region.

As described above, the reference prohibition regions for luminance vectors vary depending on the position of a slice to be encoded. Thus, the luminance-vector determining unit 140 provided in each of the encoders 102a to 102d sets reference prohibition regions depending on the position of a slice to be encoded. For example, slice position information indicating the position of a slice to be encoded may be input to the luminance-vector determining unit 140 in each of the encoders 102a to 102d. Each luminance-vector determining unit 140 may set reference prohibition regions in accordance with the input slice position information. In this case, the same configuration may be used for the encoders 102a to 102d.

The chrominance-vector determining unit 150 receives the luminance vector indicating the current reference target and the parity from the cost computing unit 133 and also receives the position of the macroblock to be encoded from the macroblock generating unit 111. Based on the received information, the chrominance-vector determining unit 150 determines whether or not a chrominance vector to be generated from the luminance vector indicating the current reference target specifies a region that may cause a motion compensation mismatch as described above. In addition, the chrominance-vector determining unit 150 outputs a determination flag indicating the result of the determination to the luminance-vector restricting unit 160. In this case, when the luminance vector specifies a region that may cause motion compensation mismatch, the determination flag is set to "1".

In the present embodiment, the chrominance-vector determining unit 150 includes a chrominance-vector computing unit 151 and a chrominance-vector region determining unit 152.

The chrominance-vector computing unit 151 computes a chrominance vector based on the luminance vector output from the cost computing unit 133. Based on the combination of the parity output from the cost computing unit 133 and the parity of the macroblock received from the macroblock generating unit 111, the chrominance-vector computing unit 151 computes a chrominance vector in accordance with one of expressions (7) to (9) noted above.

Based on the position of the macroblock to be encoded, the chrominance-vector region determining unit 152 recognizes a region specified by the chrominance vector computed by the chrominance-vector computing unit 151. The chrominance-vector region determining unit 152 determines whether or not the chrominance vector computed by the chrominance-vector computing unit 151 specifies a reference prohibition region that may cause motion compensation mismatch, and outputs a determination flag corresponding to the result of the determination.

In this case, the reference prohibition regions for chrominance vectors are set in different regions, depending on the combination of the reference-image parity output from the cost computing unit 133 and the reference-source block parity received from the macroblock generating unit 111. In the present embodiment, when the reference source block is in a top field and the reference image is in a bottom field, a region outside the upper boundary of the reference image is set as a reference prohibition region. In the present embodiment, the reference source block is in a bottom field and the reference image is in a top field, a region outside the lower boundary of the reference image is set as a reference prohibition region. When the parities are the same, no reference prohibition region is set.

In addition, similarly to the luminance-vector determining unit 140, the chrominance-vector determining unit 150 also sets reference prohibition regions for chrominance vectors at positions that vary depending on the position of a slice to be encoded. For example, slice position information indicating the position of a slice to be encoded may be input to the chrominance-vector determining unit 150 in each of the encoders 102a to 102d. Each chrominance-vector determining unit 150 may set reference prohibition regions in accordance with the input slice position information. In this case, the same configuration may be used for the encoders 102a to 102d.

The slice position information is input from, for example, the screen dividing unit 101. Alternatively, the slice position information may be pre-stored in a memory provided in each of the encoders 102a to 102d.

The luminance-vector restricting unit 160 outputs an update prohibition signal to the minimum-cost-vector updating unit 134 in accordance with the values of the determination flags from the luminance-vector determining unit 140 and the chrominance-vector determining unit 150. In the present embodiment, the luminance-vector restricting unit 160 receives the determination flags from both the luminance-vector determining unit 140 and the chrominance-vector determining unit 150 and determines a logical OR of the determination flags. That is, when at least one of the determination flags from the luminance-vector determining unit 140 and the chrominance-vector determining unit 150 indicates "1", the luminance-vector restricting unit 160 outputs an update prohibition signal.

Figure 12:
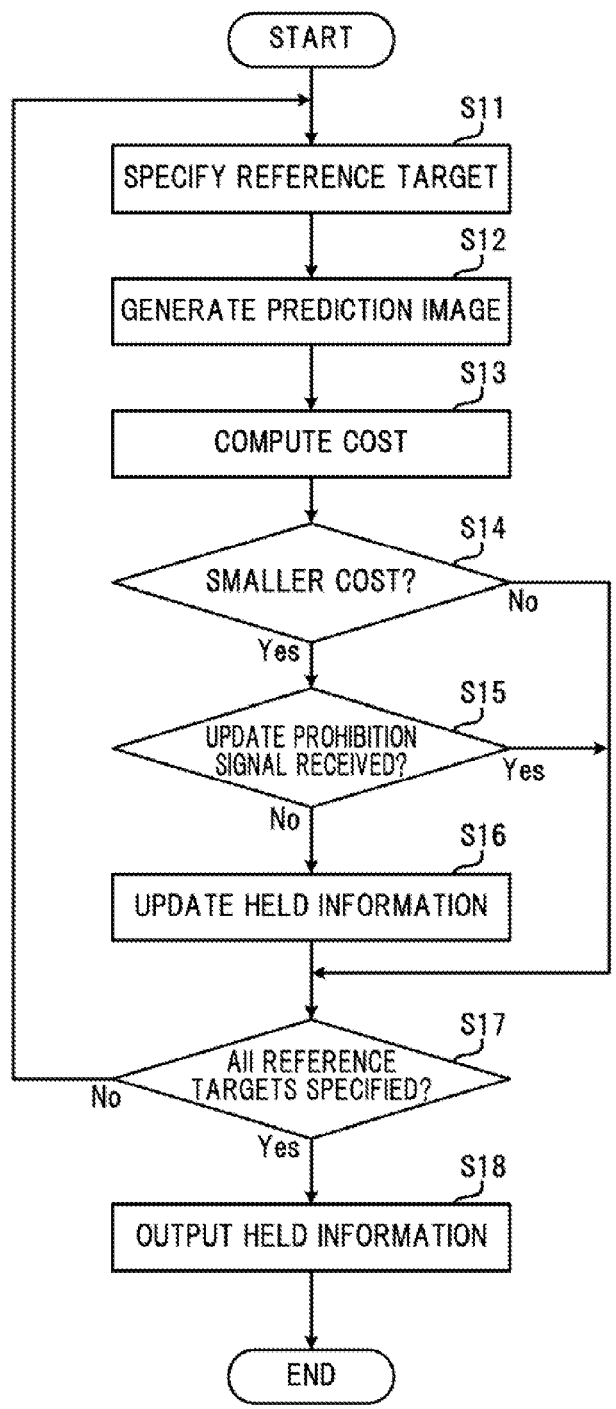
FIG. 12 is a flowchart illustrating a processing procedure performed by a luminance-vector output unit.

FIG. 12 is a flowchart illustrating a processing procedure performed by the luminance-vector output unit. The processing illustrated in FIG. 12 is executed each time a macroblock is input from the macroblock generating unit 111.

In step S11, the luminance-vector generating unit 131 outputs, to the prediction-image generating unit 132 and the cost computing unit 133, a luminance vector indicating the position of a reference target and the parity of the reference-target reference image.

In step S12, the prediction-image generating unit 132 generates a prediction image in accordance with the luminance vector and the parity output from the luminance-vector generating unit 131.

In step S13, based on data of a macroblock output from the macroblock generating unit 111 and data of the prediction image generated by the prediction-image generating unit 132, the cost computing unit 133 computes a cost in accordance with expression (10) noted above. The cost computing unit 133 outputs the computed cost, together with the luminance vector and parity received from the luminance-vector generating unit 131, to the minimum-cost-vector updating unit 134.

In this case, the cost computing unit 133 outputs the luminance vector to the luminance-vector determining unit 140 and also outputs the luminance vector and the reference-image parity to the chrominance-vector determining unit 150. The luminance-vector determining unit 140 and the chrominance-vector determining unit 150 execute determination processing based on the information output from the cost computing unit 133 and reflect results of the determinations with the respective determination flags.

In step S14, the minimum-cost-vector updating unit 134 determines whether or not the value of the cost computed by the cost computing unit 133 is smaller than the value of a cost held in the memory 134a. When the value of the computed cost is smaller, processing in step S15 is executed. Otherwise, processing in step S17 is executed.

In step S15, the minimum-cost-vector updating unit 134 determines whether or not an update prohibition signal is received from the luminance-vector restricting unit 160.

When an update prohibition signal is received from the luminance-vector restricting unit 160, processing in step S17 is executed, and when an update prohibition signal is not received, processing in step S16 is executed.

In step S16, the minimum-cost-vector updating unit 134 updates the information, held in the memory 134*a*, with the cost, luminance vector, and parity received from the cost computing unit 133.

When the processing in steps S14 to S16 is executed, in step S17, the minimum-cost-vector updating unit 134 requests the luminance-vector generating unit 131 so as to specify the position of a next reference target. The luminance-vector generating unit 131 determines whether or not all reference targets for encoding one macroblock are specified.

When an unspecified reference target is left, processing in step S11 is executed again. Consequently, the luminance-vector generating unit 131 outputs a luminance vector specifying the next reference target and parity. On the other hand, when specifying all reference targets is completed, the luminance-vector generating unit 131 notifies the minimum-cost-vector updating unit 134 that specifying all reference targets is completed. Thereafter, processing in step S18 is executed.

In step S18, the minimum-cost-vector updating unit 134 outputs the luminance vector and parity, currently held in the memory 134*a*, to the entropy encoding unit 115 and the inter-prediction-image generating unit 121. Thereafter, all of the information held in the memory 134*a* is cleared.

Figure 13:
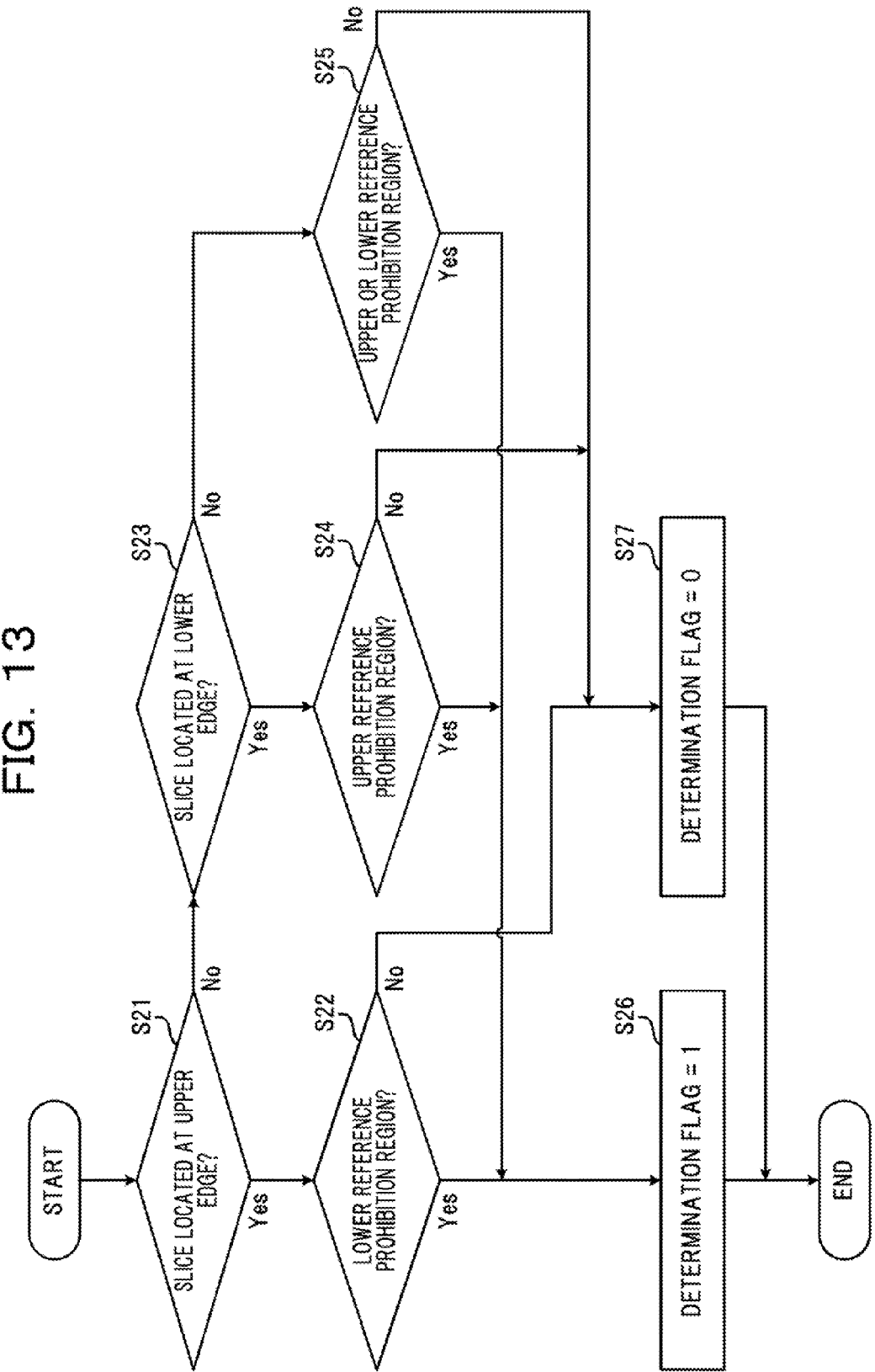
FIG. 13 is a flowchart illustrating a processing procedure performed by a luminance-vector determining unit.

FIG. 13 is a flowchart illustrating a processing procedure performed by the luminance-vector determining unit.

It is assumed in this case that slice position information indicating the position of an input slice is input to each of the encoders 102*a* to 102*d*. FIG. 13 illustrates a processing procedure performed by each of the integer-pixel-region determining unit 141, the ½-pixel-region determining unit 142, and the ¼-pixel-region determining unit 143 included in the luminance-vector determining unit 140.

In step S21, each of the region determining units 141, 142, and 143 determines whether or not the slice to be encoded is located at the upper edge of a pre-division image. When the slice to be encoded is located at the upper edge, processing in step S22 is executed. Otherwise, processing in step S23 is executed.

In step S22, each of the region determining units 141, 142, and 143 determines whether or not the input luminance vector specifies a lower reference prohibition region of the reference image.

More specifically, the integer-pixel-region determining unit 141 sets a reference prohibition region at an integer pixel outside the lower boundary of the reference image. The ½-pixel-region determining unit 142 sets reference prohibition regions at ½ pixel regions outside the lower boundary of the reference image and ½ pixel regions in the regions (e.g., the regions R13 and R14 in FIG. 9) between adjacent regions of a specific number of rows from the lower edge of the reference image. In addition, the ¼-pixel-region determining unit 143 sets reference prohibition regions at ¼ pixel regions outside the lower boundary of the reference image and ¼ pixel regions in the regions (e.g., the regions R13 and R14 in FIG. 9) between adjacent regions of a specific number of rows from the lower edge of the reference image.

When it is determined in step S22 that the input luminance vector indicates a lower reference prohibition region, processing in step S26 is executed. Otherwise, processing in step S27 is executed.

In step S23, based on the slice position information, each of the region determining units 141, 142, and 143 determines whether or not the slice to be encoded is located at the lower edge in the pre-division image. When the slice to be encoded is located at the lower edge, processing in step S24 is executed. Otherwise, e.g., when the slice position is neither the upper edge nor the lower edge in the pre-division image, processing in step S25 is executed.

In step S24, each of the region determining units 141, 142, and 143 determines whether or not the input luminance vector specifies an upper reference prohibition region of the reference image. More specifically, the integer-pixel-region determining unit 141 sets a reference prohibition region at integer pixels outside the upper boundary of the reference image. The ½-pixel-region determining unit 142 sets reference prohibition regions at ½ pixel regions outside the upper boundary of the reference image and ½ pixel regions in the regions (e.g., the regions R11 and R12 in FIG. 8) between adjacent regions of a specific number of rows from the upper edge of the reference image. In addition, the ¼-pixel-region determining unit 143 sets reference prohibition regions at ¼ pixel regions outside the upper boundary of the reference image and ¼ pixel regions in the regions (e.g., the regions R11 and R12 in FIG. 8) between adjacent regions of a specific number of rows from the upper edge of the reference image.

When it is determined in step S24 that the input luminance vector indicates the upper reference prohibition region, processing in step S26 is executed. Otherwise, processing in step S27 is executed.

In step S25, each of the region determining units 141, 142, and 143 determines whether or not the input luminance vector specifies the upper or lower reference prohibition region of the reference image.

More specifically, the integer-pixel-region determining unit 141 sets reference prohibition regions at integer-pixel regions outside the upper boundary of the reference image and integer-pixel regions outside the lower boundary of the reference image. The ½-pixel-region determining unit 142 sets reference prohibition regions at ½ pixel regions outside the upper boundary of the reference image, ½ pixel regions outside the lower boundary of the reference image, ½ pixel regions in the regions (e.g., the regions R11 and R12 in FIG. 8) between adjacent regions of a specific number of rows from the upper edge of the reference image, and ½ pixel regions in the regions (e.g., the regions R13 and R14 in FIG. 9) between adjacent regions of a specific number of rows from the lower edge of the reference image. In addition, the ¼-pixel-region determining unit 143 sets reference prohibition regions at ¼ pixel regions outside the upper boundary of the reference image, ¼ pixel regions outside the lower boundary of the reference image, ¼ pixel regions in the regions (e.g., the regions R11 and R12 in FIG. 8) between adjacent regions of a specific number of rows from the upper edge of the reference image, and ¼ pixel regions in the regions (e.g., the regions R13 and R14 in FIG. 9) between adjacent regions of a specific number of rows from the lower edge of the reference image.

When it is determined in step S25 that the input luminance vector specifies the above-described reference prohibition region, processing in step S26 is executed. Otherwise, processing in step S27 is executed.

In step S26, each of the region determining units 141, 142, and 143 sets the determination flag to "1".

In step S27, each of the region determining units 141, 142, and 143 sets the determination flag to "0".

A logical OR of the determination flag eventually output from the luminance-vector determining unit 140 to the luminance-vector restricting unit 160 and the determination flag output from each of the region determining units 141, 142, and 143 is determined.

As a result of the above-described processing, when the luminance vector specifies a region that may cause motion compensation mismatch, the determination flag output from the luminance-vector determining unit 140 indicates "1".

Figure 14:
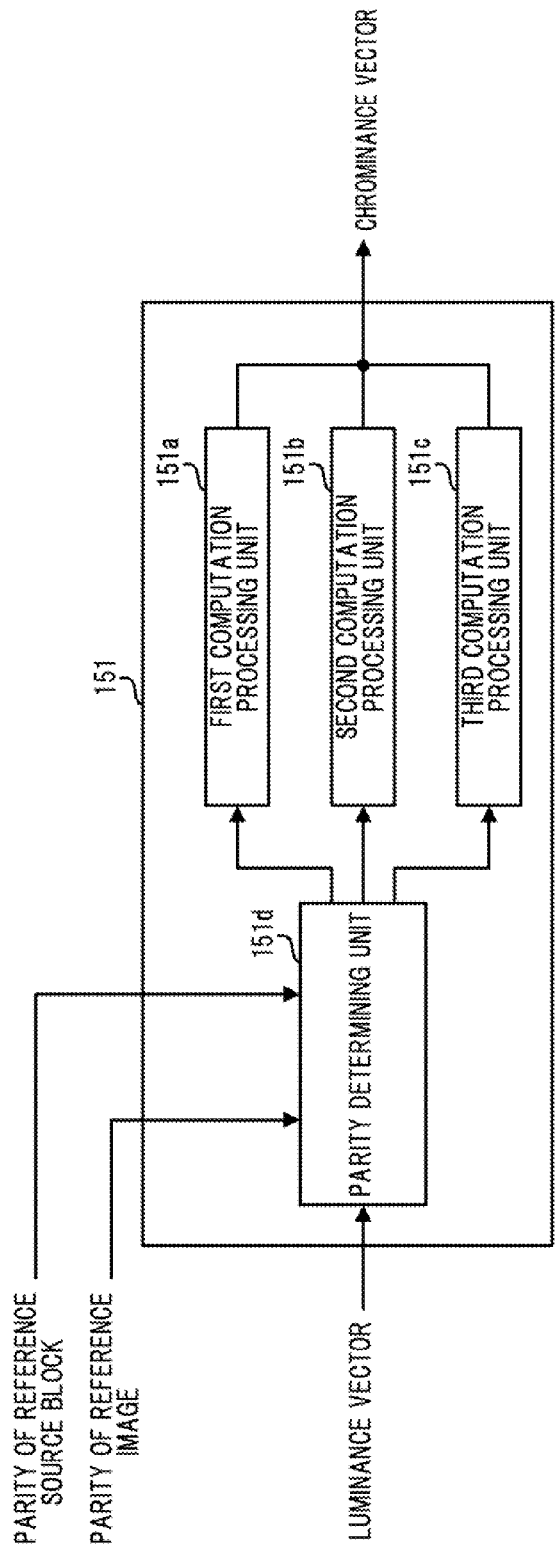
FIG. 14 is a diagram illustrating an example of the internal configuration of a chrominance-vector computing unit.

FIG. 14 is a diagram illustrating an example of the internal configuration of the chrominance-vector computing unit. It is assumed in this case that slice position information indicating the position of an input slice is input to each of the encoders 102a to 102d, as in the example illustrated in FIG. 13.

The chrominance-vector computing unit 151 includes first to third computation processing units 151a to 151c and a parity determining unit 151d. The first to third computation processing units 151a to 151c compute chrominance vectors based on the luminance vector.

The first to third computation processing units 151a to 151c are capable of computing chrominance vectors by using respective arithmetic expressions. In the present embodiment, the first computation processing unit 151a computes a chrominance vector in accordance with expression (7) noted above, the second computation processing unit 151b computes a chrominance vector in accordance with expression (8), and the third computation processing unit 151c computes a chrominance vector in accordance with expression (9).

In accordance with the combination of the parity of the reference-source block and the parity of the reference image, the parity determining unit 151d selectively outputs the input luminance vector to one of the first to third computation processing units 151a to 151c. Specific processing for the selection is described below with reference to FIG. 15.

Provision of the individual computation processing units that are capable of computing chrominance vectors by using the respective arithmetic expressions, as illustrated in FIG. 14, makes it possible to handle a case in which the arithmetic expression for the chrominance vectors is changed according to a new coding specification. Thus, the versatility of the encoders 102a to 102d is enhanced and the manufacturing and development costs are reduced.

Figure 15:
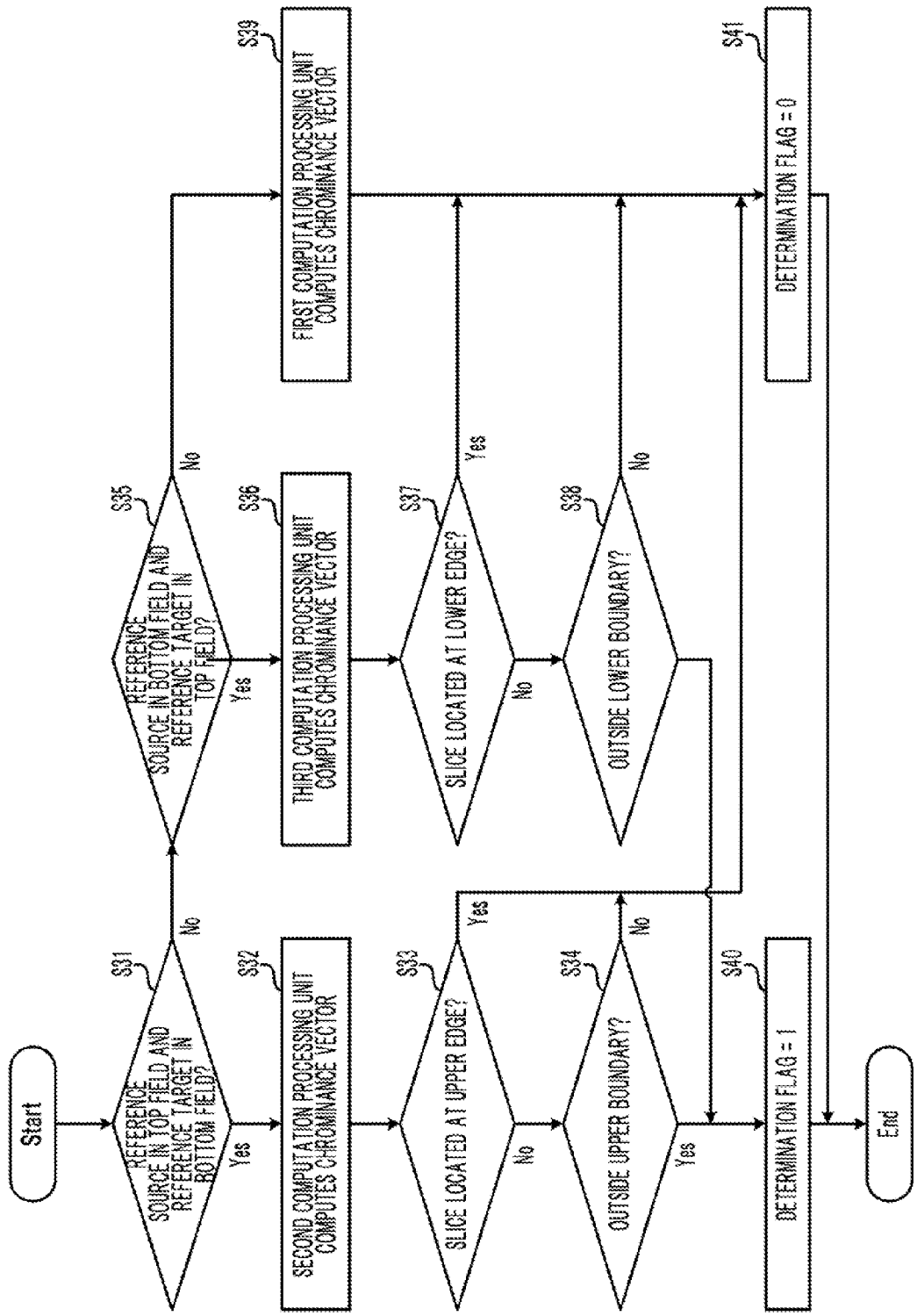
FIG. 15 is a flowchart illustrating a processing procedure performed by a chrominance-vector determining unit.

FIG. 15 is a flowchart illustrating a processing procedure performed by the chrominance vector determining unit.

In step S31, the parity determining unit 151d determines whether or not the reference-source block is in a top field and the reference image is in a bottom field. When this condition is satisfied, processing in step S32 is executed, and when the condition is not satisfied, processing in step S35 is executed.

In step S32, the parity determining unit 151d selects the second computation processing unit 151b and supplies the luminance vector to the second computation processing unit 151b. The second computation processing unit 151b computes a chrominance vector in accordance with expression (8) and outputs the computed chrominance vector to the chrominance-vector region determining unit 152.

In step S33, based on the slice position information, the chrominance-vector region determining unit 152 determines whether or not the slice to be encoded is located at the upper edge in the pre-division image. When the slice to be encoded is located at the upper edge, processing in step S41 is executed. Otherwise, processing in step S34 is executed.

In step S34, based on the position of the reference-source block, the chrominance-vector region determining unit 152 determines whether or not the chrominance vector output from the chrominance-vector computing unit 151 specifies a region outside the upper boundary of the reference image. When the chrominance vector specifies a region outside the upper boundary of the reference image, processing in step S40 is executed, and when the chrominance vector does not specify a region outside the upper boundary of the reference image, processing in step S41 is executed.

In step S35, the parity determining unit 151d determines whether or not the reference-source block is in a bottom field and the reference image is in a top field. When this condition is satisfied, processing in step S36 is executed. On the other hand, when the condition is not satisfied, e.g., when the parity of the reference-source block and the parity of the reference image are the same, processing in step S39 is executed.

In step S36, the parity determining unit 151d selects the third computation processing unit 151c and supplies the luminance vector to the third computation processing unit 151c. The third computation processing unit 151c computes a chrominance vector in accordance with expression (9) and outputs the computed chrominance vector to the chrominance-vector region determining unit 152.

In step S37, based on the slice position information, the chrominance-vector region determining unit 152 determines whether or not the slice to be encoded is located at the lower edge in the pre-division image. When the slice to be encoded is located at the lower edge, processing in step S41 is executed. Otherwise, processing in step S38 is executed.

In step S38, based on the position of the reference-source block, the chrominance-vector region determining unit 152 determines whether or not the chrominance vector output from the chrominance-vector computing unit 151 specifies a region outside the lower boundary of the reference image. When the chrominance vector specifies a region outside the lower boundary of the reference image, processing in step S40 is executed, and when the chrominance vector does not specify a region outside the lower boundary of the reference image, processing in step S41 is executed.

In step S39, the parity determining unit 151d selects the first computation processing unit 151a and supplies the luminance vector to the first computation processing unit 151a. The first computation processing unit 151a computes a chrominance vector in accordance with expression (7) and outputs the computed chrominance vector to the chrominance-vector region determining unit 152. Thereafter, processing in step S41 is executed.

In step S40, the chrominance-vector region determining unit 152 sets the determination flag to "1".

In step S41, the chrominance-vector region determining unit 152 sets the determination flag to "0".

In the processing in FIG. 15, when the chrominance vector specifies a region outside the boundary of the reference image independent of which region the luminance vector specifies, the determination flag output from the chrominance-vector determining unit 150 indicates "1".

As described above, the luminance-vector restricting unit 160 determines a logical OR of the determination flags output from the luminance-vector determining unit 140 and the chrominance-vector determining unit 150 and outputs a resulting update prohibition signal. Thus, the minimum-cost-vector updating unit 134 does not hold a luminance vector specifying a region that may cause motion compensation mismatch, even when the cost is minimal. Consequently, occurrence of motion compensation mismatch is reliably reduced if not prevented.

For the sake of reference, a description will now be given of the luminance vector eventually output from the minimum-cost-vector updating unit 134.

Figure 16:
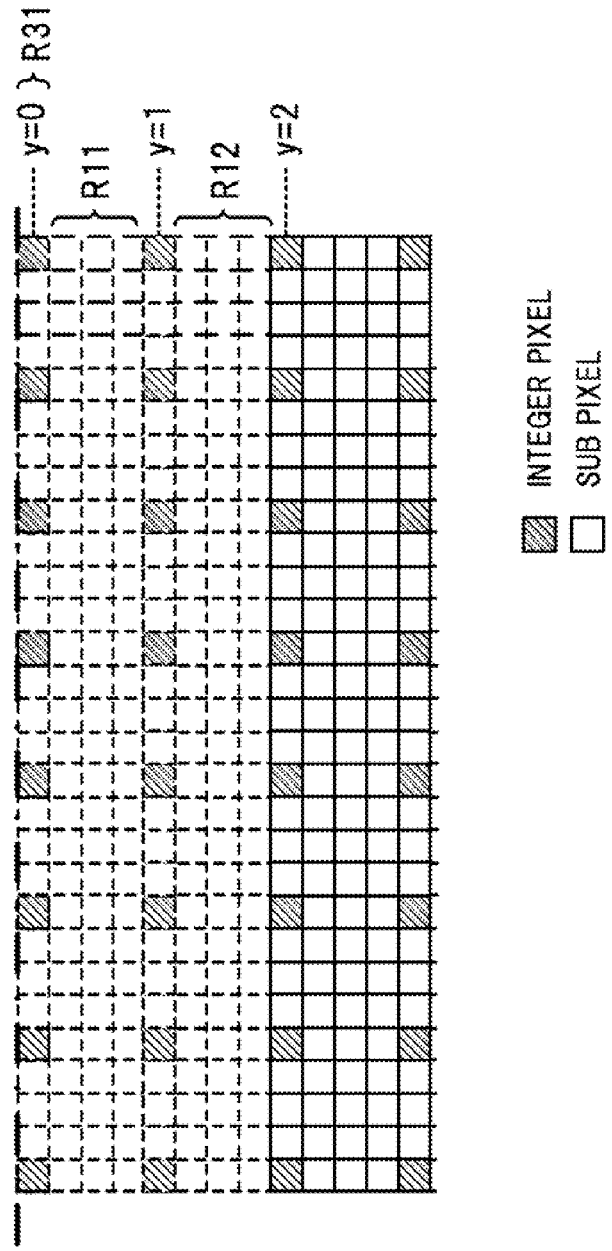
FIG. 16 illustrates reference prohibition regions at the upper edge of the reference image.

FIG. 16 is a diagram illustrating a reference prohibition region at the upper edge of the reference image.

FIG. 16 indicates a region in the vicinity of the upper edge of the reference image, as in the case of FIG. 8. A dashed-dotted line in FIG. 16 represents an upper screen boundary of the reference image. When the reference source block is in a top field and the reference image is in a bottom field, the chrominance vector is shifted upward by a ¼ pixel from the luminance vector in accordance with expression (8) noted above. In H.264, the motion vector specifies a position at a minimum of a ¼ pixel.

Thus, when the luminance vector specifies a row of y=0 corresponding to the upper edge of the reference image, e.g., a region R31 in FIG. 16, the chrominance vector specifies a region outside the upper boundary of the reference image in accordance with expression (8) noted above. Thus, when the combination of the parities is the combination of a top field for the reference-source block and a bottom field for reference image, the minimum-cost-vector updating units 134 in at least the encoders 102b to 102d prohibit outputting of motion vectors that specify a region outside the upper boundary of the reference image and the region R31 as well as the regions R11 and R12.

It is now assumed that the motion vector is capable of specifying a position at a minimum of a 1/p pixel (where p>0) and the chrominance vector is generated by shifting the luminance vector upward by a 1/q pixel (where q p). In this case, the region R31 that is prohibited from being referred to by a luminance vector may be expressed as a region between a row corresponding to the position of y=0 and a row corresponding to the position of y=(1/q)−(1/p).

Figure 17:
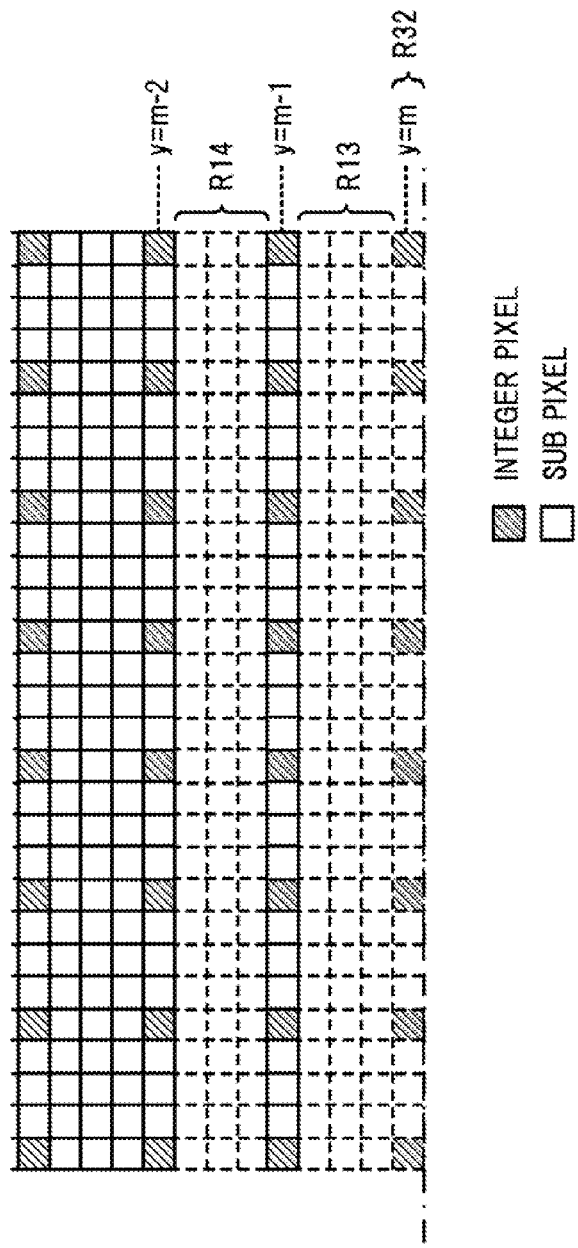
FIG. 17 illustrates reference prohibition regions at the lower edge of the reference image.

FIG. 17 is a diagram illustrating reference prohibition regions at the lower edge of the reference image.

FIG. 17 indicates a region in the vicinity of the lower edge of the reference image, as in the case of FIG. 9. The dashed-dotted line in FIG. 17 represents a lower screen boundary of the reference image. When the reference source block is in a bottom field and the reference image is in a top field, the chrominance vector is shifted downward by a ¼ pixel from the luminance vector in accordance with expression (9) noted above. In H.264, the motion vector specifies a position at a minimum of a ¼ pixel.

It is assumed in this case that the input slice has m+1 integer pixels, e.g., between y=0 and y=m in the vertical direction, where m is an integer of 1 or greater. In this case, when the luminance vector specifies the row of y=m corresponding to the lower edge of the reference image, e.g., a region R32 in FIG. 17, the chrominance vector specifies a region outside the lower boundary of the reference image in accordance with expression (9) noted above. Thus, when the combination of the parities is the combination of a bottom field for the reference-source block and a top field for the reference image, the minimum-cost-vector updating units 134 in at least the encoders 102a to 102c prohibit outputting of motion vectors that specify a region outside the lower boundary of the reference image and the region R32 as well as regions R13 and R14.

It is now assumed that the motion vector is capable of specifying a position at a minimum of a 1/p pixel and the chrominance vector is generated by shifting the luminance vector downward by a 1/q pixel (where q p). In this case, the region R32 that is prohibited from being referred to by a luminance vector may be expressed as a region between the row corresponding to the position of y=m and a row corresponding to the position of y=m−{(1/q)−(1/p)}.

Third Embodiment

Figure 18:
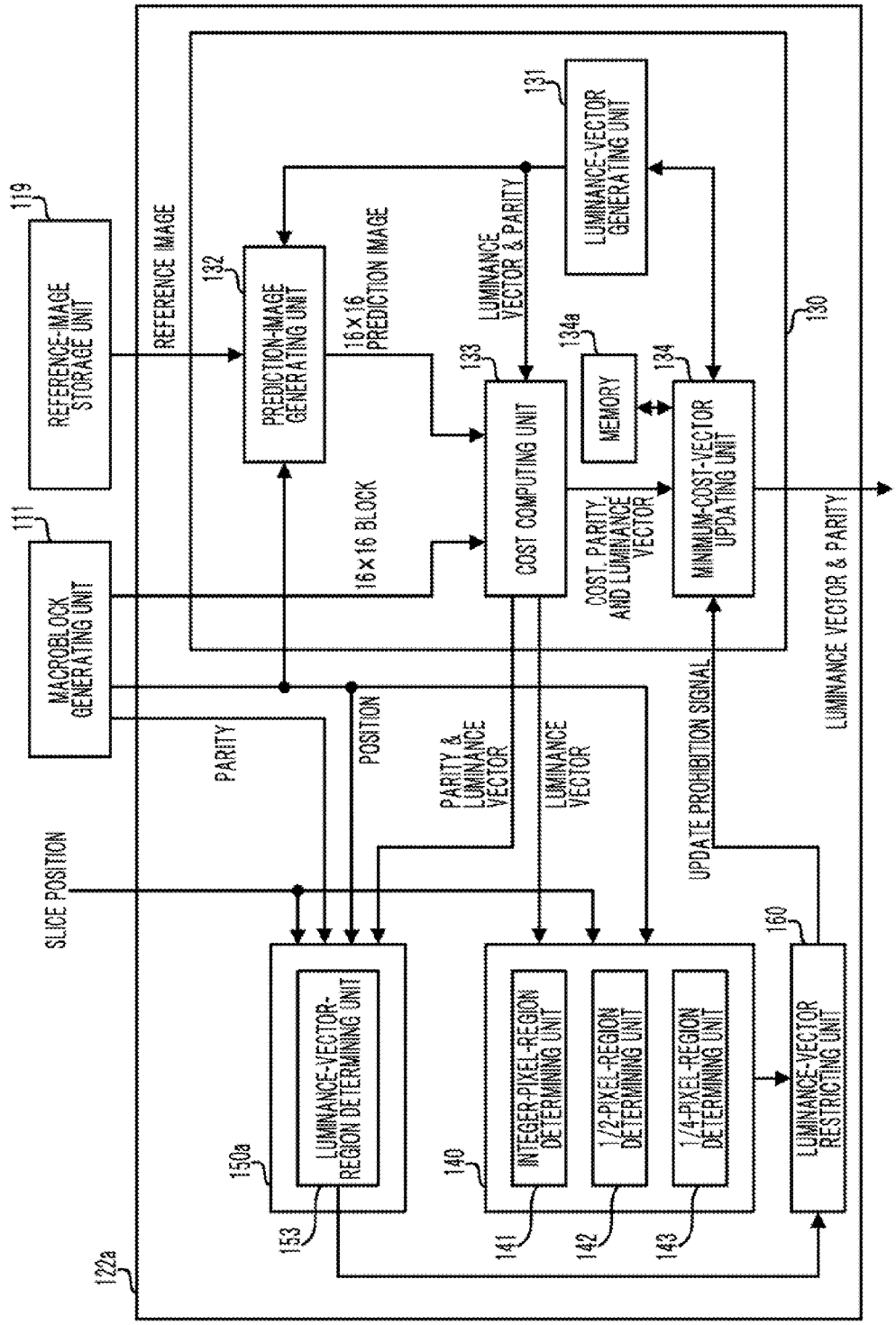
FIG. 18 is a diagram illustrating an example of the internal configuration of a motion-vector computing unit according to a third embodiment.

FIG. 18 is a diagram illustrating an example of the internal configuration of a motion-vector computing unit according to a third embodiment. In FIG. 18, elements corresponding to those in FIG. 11 are denoted by the same reference numerals.

A motion-vector computing unit 122a illustrated in FIG. 18 has a configuration in which, instead of the chrominance-vector determining unit 150, a chrominance-vector determining unit 150a having a luminance-vector-region determining unit 153 is provided in the motion-vector computing unit 122 illustrated in FIG. 11.

The luminance-vector-region determining unit 153 receives a luminance vector indicating the current reference target and parity from the cost computing unit 133 and also receives the position of a macroblock to be encoded from the macroblock generating unit 111. Based on the information of the received luminance vector and the position of the macroblock, the luminance-vector-region determining unit 153 determines whether or not a chrominance vector when it is generated based on the luminance vector specifies a region that may cause motion compensation mismatch as described above. That is, the luminance-vector-region determining unit 153 operates so as to reduce or prevent occurrence of motion compensation mismatch in the H.264 system without actually determining a chrominance vector based on a luminance vector.

Figure 19:
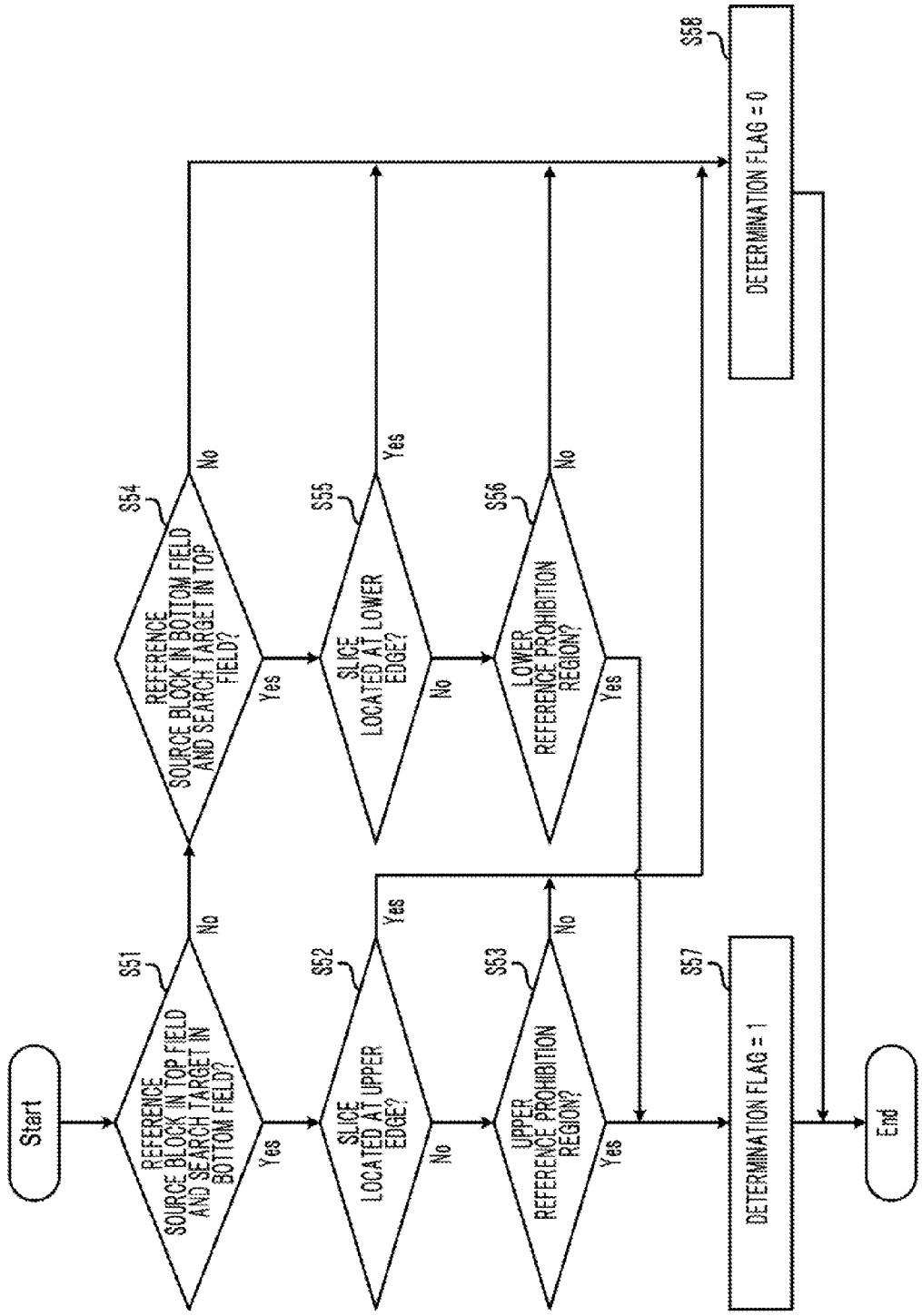
FIG. 19 is a flowchart of a processing procedure performed by a chrominance-vector determining unit according to the third embodiment.

FIG. 19 is a flowchart of a processing procedure performed by the chrominance-vector determining unit according to the third embodiment.

In step S51, the luminance-vector-region determining unit 153 in the chrominance-vector determining unit 150a determines whether or not the reference-source block is in a top field and the search-target reference image is in a bottom field. When this condition is satisfied, processing in step S52 is executed, and when the condition is not satisfied, processing in step S54 is executed.

In step S52, based on the slice position information, the luminance-vector-region determining unit 153 determines whether or not the slice to be encoded is located at the upper edge in the pre-division image. When the slice to be encoded is located at the upper edge, processing in step S58 is executed. Otherwise, processing in step S53 is executed.

In step S53, the luminance-vector-region determining unit 153 determines whether or not the luminance vector output from the cost computing unit 133 specifies the upper reference prohibition region of the reference image, that is, the region R31 illustrated in FIG. 16. When the luminance vector specifies the upper reference prohibition region, processing in step S57 is executed, and when the luminance vector does not specify the upper reference prohibition region, processing in step S58 is executed.

In step S54, the luminance-vector-region determining unit 153 determines whether or not the reference-source block is in the bottom field and the search-target reference image is in the top field. When this condition is satisfied, processing in step S55 is executed. When the condition is not satisfied, e.g., when the parity of the reference-source block and the parity of the reference image are the same, processing in step S58 is executed.

In step S55, based on the slice position information, the luminance-vector-region determining unit 153 determines whether or not the slice to be encoded is located at the lower edge in the pre-division image. When the slice to be encoded is located at the lower edge, processing in step S58 is executed. Otherwise, processing in step S56 is executed.

In step S56, the luminance-vector-region determining unit 153 determines whether or not the luminance vector output from the cost computing unit 133 specifies the lower reference prohibition region of the reference image, that is, the region R32 illustrated in FIG. 17. When the luminance vector specifies the lower reference prohibition region, processing in step S57 is executed, and when the luminance vector does not specify the lower reference prohibition region, processing in step S58 is executed.

In step S57, the luminance-vector-region determining unit 153 sets the determination flag to "1".

In step S58, the luminance-vector-region determining unit 153 sets the determination flag to "0".

When the chrominance vector to be generated based on the luminance vector specifies a region outside the boundary of the reference image in the processing in FIG. 19, the determination flag output from the chrominance-vector determining unit 150a indicates "1". This arrangement may reduce of not prevent occurrence of motion compensation mismatch caused by determination of a chrominance vector based on a luminance vector. Since a chrominance vector is not actually determined, a processing load is reduced compared to the case of the second embodiment.

Fourth Embodiment

Figure 20:
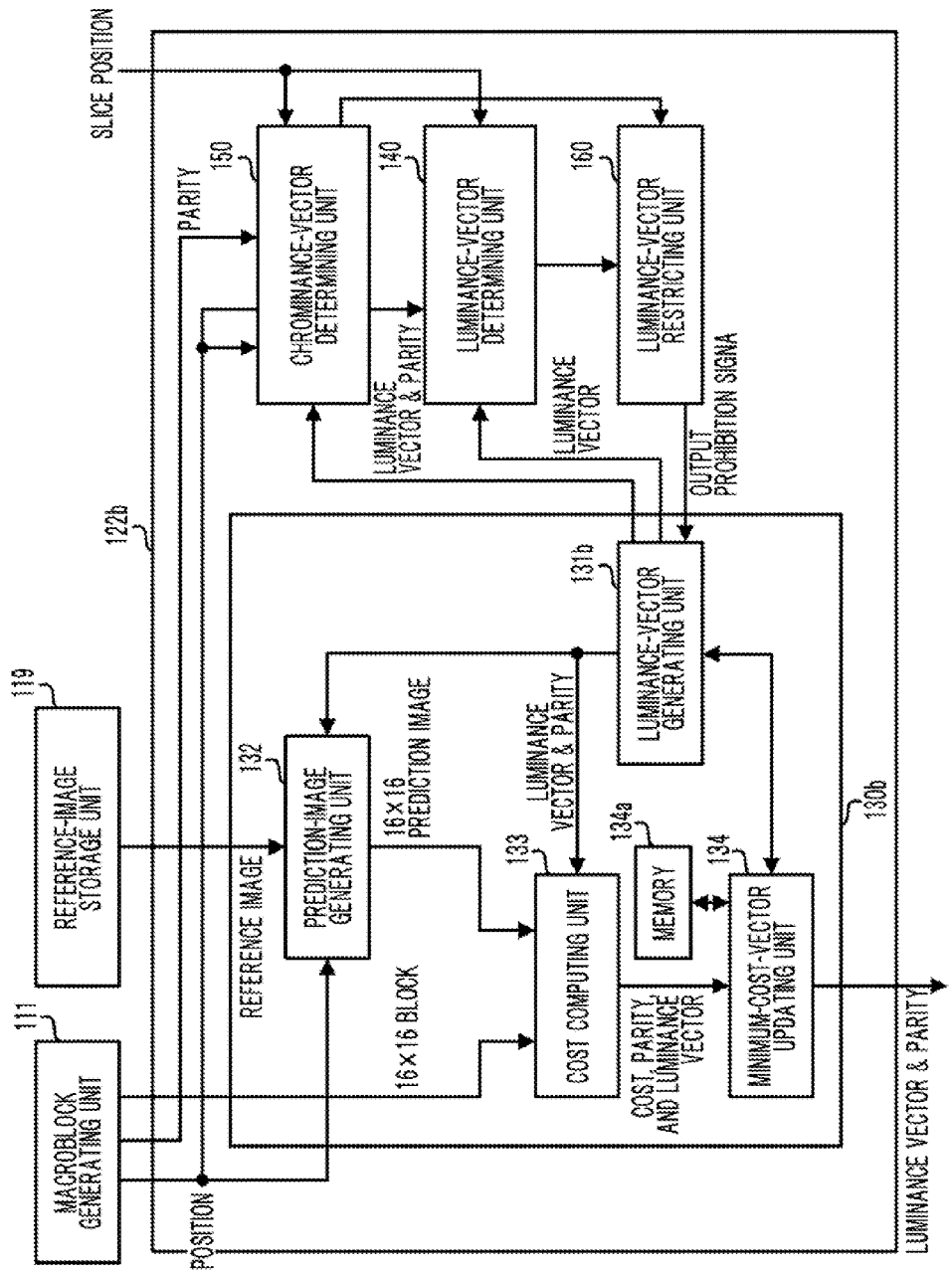
FIG. 20 is a diagram illustrating an example of the internal configuration of a motion-vector computing unit according to a fourth embodiment.

FIG. 20 is a diagram illustrating an example of the internal configuration of a motion-vector computing unit according to a fourth embodiment. In FIG. 20, elements corresponding to those in FIG. 11 are denoted by the same reference numerals.

In the second and third embodiments described above, when a luminance vector that may cause motion compensation mismatch is output, the luminance-vector restricting unit 160 outputs the update prohibition signal to reduce or prevent the minimum-cost-vector updating unit 134 from updating the held data. In contrast, a motion-vector computing unit 122b illustrated in FIG. 20 is adapted so that, when a search target that may cause motion compensation mismatch is specified, a luminance vector specifying the search target is not output to the prediction-image generating unit 132 and the cost computing unit 133.

In FIG. 20, a luminance-vector generating unit 131b provided in a luminance-vector output unit 130b has a function for restricting outputting a luminance vector and parity to the prediction-image generating unit 132 and the cost computing unit 133, in addition to the function of the luminance-vector generating unit 131 illustrated in FIG. 11. The luminance-vector generating unit 131b first outputs the luminance vector specifying a search target and parity to the luminance-vector determining unit 140 and the chrominance-vector determining unit 150. When an output prohibition signal is input from the luminance-vector restricting unit 160 based on determination processing performed by the luminance-vector determining unit 140 and the chrominance-vector determining unit 150, the luminance-vector generating unit 131b does not output the luminance vector and the parity to the prediction-image generating unit 132 and the cost computing unit 133.

The output prohibition signal output from the luminance-vector restricting unit 160 is a signal that is substantially analogous to the update prohibition signal in the second and third embodiments. Although the chrominance-vector determining unit 150 described in the second embodiment is used in the present embodiment, the chrominance-vector determining unit 150a described in the third embodiment may be used instead.

Figure 21:
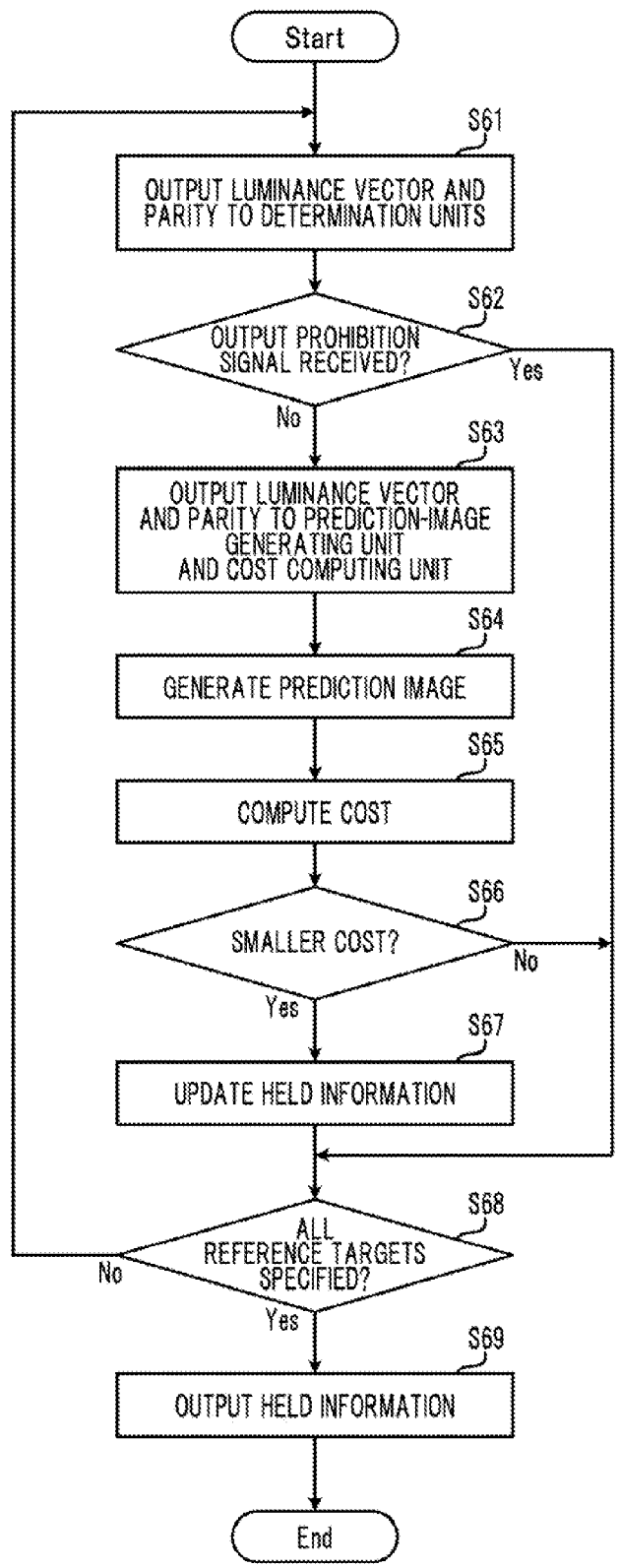
FIG. 21 is a flowchart illustrating a processing procedure performed by a luminance-vector output unit according to the fourth embodiment.

FIG. 21 is a flowchart illustrating a processing procedure performed by the luminance-vector output unit according to the fourth embodiment. The processing illustrated in FIG. 21 is executed each time a macroblock is input from the macroblock generating unit 111.

In step S61, the luminance-vector generating unit 131b outputs, to the luminance-vector determining unit 140 and the chrominance-vector determining unit 150, the luminance vector indicating the position of a reference target and the parity of the reference-target reference image. The luminance-vector determining unit 140 and the chrominance-vector determining unit 150 execute determination processing based on the information output from the luminance-vector generating unit 131b and reflect results of the determinations in the corresponding determination flags.

In step S62, the luminance-vector generating unit 131b determines whether or not the output prohibition signal is received from the luminance-vector restricting unit 160. When the output prohibition signal is received from the luminance-vector restricting unit 160, processing in step S68 is executed, and when the output prohibition signal is not received, processing in step S63 is executed.

In step S63, the luminance-vector generating unit 131b outputs, to the prediction-image generating unit 132 and the cost computing unit 133, the luminance vector and parity that are the same as the luminance vector and parity output in step S61.

In step S64, the prediction-image generating unit 132 generates a prediction image based on the luminance vector and parity output from the luminance-vector generating unit 131b.

In step S65, based on data of the macroblock output from the macroblock generating unit 111 and data of the prediction image generated by the prediction-image generating unit 132, the cost computing unit 133 computes a cost in accordance with expression (10) noted above. The cost computing unit 133 then outputs the computed cost, together with the luminance vector and parity received from the luminance-vector generating unit 131b, to the minimum-cost-vector updating unit 134.

In step S66, the minimum-cost-vector updating unit 134 determines whether or not the value of the cost computed by the cost computing unit 133 is smaller than the value of the cost held in the memory 134a. When the value of the computed cost is smaller than the value of the cost held in the memory 134a, processing in step S67 is executed. Otherwise, processing in step S68 is executed.

In step S67, the minimum-cost-vector updating unit 134 updates the information, held in the memory 134a, with the cost, luminance vector, and parity received from the cost computing unit 133.

In step S68, the minimum-cost-vector updating unit 134 requests the luminance-vector generating unit 131b to specify the position of a next reference target. The luminance-vector generating unit 131b determines whether or not all reference targets for encoding one macroblock are specified.

When an unspecified reference target is left, processing in step S61 is executed again. Thus, the luminance-vector generating unit 131b outputs a luminance vector specifying the next reference target and parity. On the other hand, when specifying all reference targets is completed, the luminance-vector generating unit 131b notifies the minimum-cost-vector updating unit 134 that specifying all reference targets is completed. Thereafter, processing in step S69 is executed.

In step S69, the minimum-cost-vector updating unit 134 outputs the luminance vector and parity, currently held in the memory 134a, to the entropy encoding unit 115 and the inter-prediction-image generating unit 121. Thereafter, all of the information held in the memory 134a is cleared.

According to the processing described above, when the luminance vector output from the luminance-vector generating unit 131b specifies a position that may cause motion compensation mismatch, the information held in the memory 134a is not updated. Furthermore, neither the prediction-image generation processing nor the cost computation processing is executed. Consequently, it is possible to reduce the load of processing performed by the motion-vector computing unit 122b.

Fifth Embodiment

Figure 22:
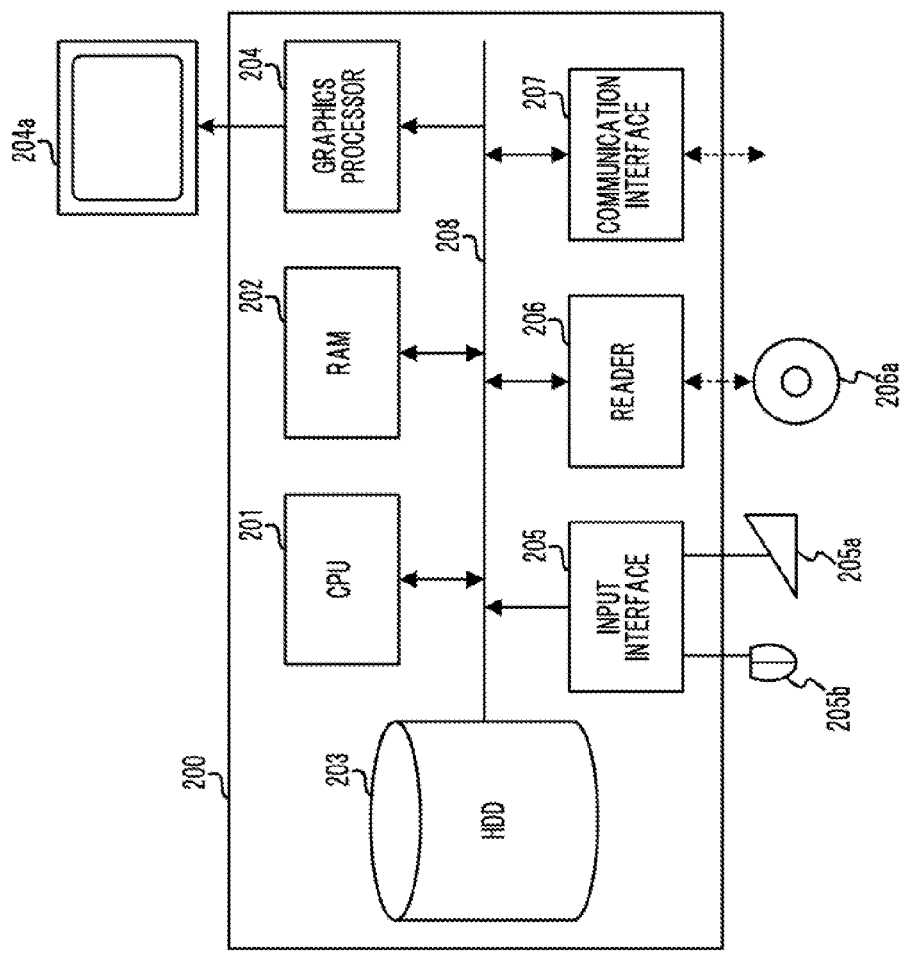
FIG. 22 is a diagram illustrating an example of the hardware configuration of a computer according to a fifth embodiment.

FIG. 22 is a diagram illustrating an example of the hardware configuration of a computer according to a fifth embodiment.

All or some of the functions of the image encoding device described in the second to fourth embodiments may also be realized by software processing. FIG. 22 illustrates a computer for realizing those functions by executing software.

A computer 200 illustrated in FIG. 22 includes a CPU (central processing unit) 201, a RAM (random access memory) 202, a HDD (hard disk drive) 203, a graphics processor 204, an input interface 205, a reader 206, and a communication interface 207, all of which are interconnected through a bus 208.

The CPU 201 controls the computer 200 by executing various programs stored in the HDD 203. The RAM 202 temporarily stores at least part of the program(s) to be executed by the CPU 201 and various types of data needed for processing for the program(s). The HDD 203 stores the program(s) to be executed by the CPU 201, various types of data needed for execution of the program(s), and so on.

A monitor 204a is coupled to the graphics processor 204. In accordance with an instruction from the CPU 201, the graphics processor 204 displays an image on the screen of the monitor 204a. A keyboard 205a and a mouse 205b are coupled to the input interface 205. The input interface 205 sends signals, input from the keyboard 205a and the mouse 205b, to the CPU 201 through the bus 208.

The reader 206 reads data from a portable recording medium 206a and sends the read data to the CPU 201 through the bus 208. As the portable recording medium 206a, for example, an optical disk may be used. The communication interface 207 is coupled with an external device via a connector (not illustrated) to transmit/receive data to/from the external device.

When all or some of the functions described above in the second to fourth embodiments are realized by software processing, a program in which the contents of the processing of the functions are written is stored in, for example, the HDD 203. The program is then executed by the CPU 201 to realize the functions.

For example, the encoders 102a to 102d having only the functions of the luminance-vector output units 130 and 130b, of the functions described in the second to fourth embodiments, may be provided as hardware circuits in the graphics processor 204. In this case, the encoders 102a to 102d may be realized as discrete semiconductor integrated circuits or may be realized as a single semiconductor integrated circuit.

In such a case, only the functions of the luminance-vector determining unit 140, the chrominance-vector determining units 150 and 150a, and the luminance-vector restricting unit 160 may be realized by software processing executed by the CPU 201. In this case, the functions of the screen dividing unit 101 and the multiplexer 103 illustrated in FIG. 2 may be realized by a hardware circuit in the graphics processor 204 or may be realized by software processing executed by the CPU 201.

Although the second to fifth embodiments described above have configurations in which slices divided by the screen dividing unit 101 are encoded by the respective encoders 102a to 102d, another configuration may be used. For example, the slices divided by the screen dividing unit 101 may be encoded by a single encoder 102. In such a case, for example, data of the divided slices are temporarily buffered in a memory. Data of each slice is sequentially input from the memory to the single encoder 102 and is subjected to encoding processing for each slice. The encoded data of the slices are buffered in a memory and are then multiplexed by the multiplexer 103.

As described above, at least one of the functions of the above-described image encoding device may be realized by a computer. In such a case, a program in which the contents of the processing of the functions are written is supplied. When the program is executed by the computer, the above-described processing functions are realized on the computer. The program in which the contents of the processing are written may be recorded to a computer-readable recording medium. Examples of the computer-readable recording medium include a magnetic recording device, an optical disk, a magneto-optical recording medium, and a semiconductor memory.

For distribution of the program, for example, portable recording media (such as optical disks) on which the program is recorded may be made commercially available. The program may also be stored in a storage device in a server computer so that the program may be transferred therefrom to another computer over a network.

For example, a computer for executing the program stores the program, recorded on the portable recording medium or transferred from the server computer, in a storage device of the computer. The computer reads the program from the storage device thereof to execute processing according to the program. The computer may also directly read the program from the portable recording medium to execute the processing according to the program. In addition, each time the program is transferred from the server computer, the computer may sequentially execute the processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image encoding device that encodes data of an input moving image based on an interlace system by using a moving-image coding system that is capable of generating a chrominance-component motion vector based on a luminance-component motion vector during decoding, the image encoding device comprising:

a motion-vector output unit that sequentially receives data of images obtained by at least vertically dividing an image in each field included in the input moving image, and that outputs the luminance-component motion vector for searching for a region similar to a encoding target region to be encoded in one of the divided images from a reference image based on another divided image at the same position, and outputs a field type of the reference image referred to by the motion vector;

a reference-region determining unit that determines whether or not the chrominance-component motion vector generated based on the luminance-component motion vector output from the motion-vector output unit specifies a reference prohibition region preset at least one of outside an upper boundary of the reference image and outside a lower boundary of the reference image, for each combination of a field type of the region to be encoded and the field type of the reference image, the field type of the reference image being output from the motion-vector output unit; and a motion-vector output restricting unit that prohibits, when the chrominance-component motion vector generated based on the luminance-component motion vector output from the motion-vector output unit specifies the reference prohibition region, the luminance-component motion vector from being output as a motion vector specifying a region that is most similar to the region to be encoded.

2. The image encoding device according to claim 1, wherein the reference-region determining unit determines the chrominance-component motion vector by using a calculation expression that differs for each combination of the field type of the region to be encoded and the field type of the reference image, based on the luminance-component motion vector output from the motion-vector output unit, and determines whether the determined chrominance-component motion vector specifies the reference prohibition region.

3. The image encoding device according to claim 2, wherein, when the field type of the region to be encoded is a top field, and the field type of the reference image is a bottom field, the reference-region determining unit sets a region outside the upper boundary of the reference image as the reference prohibition region; when the field type of the region to be encoded is a bottom field and the field type of the reference image is a top field, the reference-region determining unit sets a region outside the lower boundary of the reference image as the reference prohibition region; and when the field type of the region to be encoded and the field type of the reference image are the same, the reference-region determining unit does not set the reference prohibition region.

4. The image encoding device according to claim 2, wherein the reference-region determining unit includes a plurality of computation processing units that are capable of determining chrominance-component motion vectors by using different calculation expressions based on the luminance-component motion vector output from the motion-vector output unit, and in accordance with the combination of the field type of the region to be encoded and the field type of the reference image, the reference-region determining unit selects one of the plurality of computation processing units to determine the chrominance-component motion vector.

5. The image encoding device according to claim 1, wherein the reference-region determining unit presets, in a region in the reference image, a reference prohibition luminance region specified by a luminance-component motion vector when a chrominance-component motion vector generated based on the luminance-component motion vector specifies the reference prohibition region, and the reference-region determining unit determines whether the luminance-component motion vector output from the motion vector output unit specifies the reference prohibition luminance region; and when the luminance-component motion vector output from the motion-vector output unit specifies the reference prohibition luminance region, the motion-vector output restricting unit prohibits the luminance-component motion vector from being output as a motion vector specifying a region that is most similar to the region to be encoded.

6. The image encoding device according to claim 5, wherein, when the divided image has m+1 pixels between $y=0$ and $y=m$ in a vertical direction where m is an integer of 1 or greater, the luminance-component motion vector is capable of specifying a position at a minimum of a 1/p pixel unit (where p>0), and the chrominance-component motion vector is generated by shifting the luminance-component motion vector upward or downward by a 1/q pixel (where $q \leq p$) in accordance with the combination of the field type of the region to be encoded and the field type of the reference image, the reference prohibition luminance region is set in a region between a row corresponding to a position of $y=0$ and a row corresponding to a position of $y=(1/q)-(1/p)$, or in a region between a row corresponding to a position of $y=m$ and a row corresponding to a position of $y=m-\{(1/q)-(1/p)\}$.

7. The image encoding device according to claim 6, wherein, when the field type of the region to be encoded is a top field and the field type of the reference image is a bottom field, the reference-region determining unit sets, as the reference prohibition luminance region, a region between the row corresponding to the position of $y=0$ and the row corresponding to the position of $y=(1/q)-(1/p)$; when the field type of the region to be encoded is a bottom field and the field type of the reference image is a top field, the reference-region determining unit sets, as the reference prohibition luminance region, a region between the row corresponding to the position of $y=m$ and the row corresponding to the position of $y=m-\{(1/q)-(1/p)\}$; and when the field type of the region to be encoded and the field type of the reference image are the same, the reference-region determining unit does not set the reference prohibition region.

8. The image encoding device according to claim 1, further comprising:

a plurality of encoders that encode the input divided images, each encoder including the motion vector output unit, the reference-region determining unit, and the motion-vector output restricting unit;

an image dividing unit that divides the image of each field included in the input moving image into the divided images and that inputs the divided images to the respective encoders; and a multiplexer that multiplexes data of the divided images encoded by the encoders and that outputs the data as encoded data of the input moving image.

9. The image encoding device according to claim 8, wherein the reference-region determining unit in the encoder to which the divided image corresponding to an uppermost portion in the field included in the input moving image is input sets the reference prohibition region at a region outside the lower boundary of the reference image, the reference-region determining unit in the encoder to which the divided image corresponding to a lowermost portion in the field included in the input moving image is input sets the reference prohibition region at a region outside the upper boundary of the reference image, and the reference-region determining unit in the encoder to which the divided image corresponding to a region except the uppermost and lowermost portions in the field included in the input moving image is input sets the reference prohibition region at a region outside the upper boundary of the reference image with respect to one of the combinations of the field type of the region to be encoded and the field type of the reference image, and sets the reference prohibition region at a region outside the lower boundary of the reference image with respect to another combination.

10. The image encoding device according to claim 1, further comprising:

a similarity output unit that outputs, each time the luminance-component motion vector is output, similarity information corresponding to a similarity between the region to be encoded and an image region based on the reference image specified by the luminance-component motion vector output from the motion-vector output unit; and a motion-vector holding unit that holds the similarity information output from the similarity output unit and the luminance-component motion vector corresponding to the similarity information, and while searching for a region similar to the region to be encoded, when the similarity information being held and new similarity information output from the similarity determining unit indicate that an image region specified by the luminance-component motion vector corresponding to the output new similarity information is more similar to the region to be encoded than the image region specified by the held luminance-component motion vector, the motion-vector holding unit updates the similarity information being held and the luminance-component motion vector with the new similarity information and the luminance-component motion vector corresponding thereto;

wherein, when the chrominance-component motion vector generated based on the luminance-component motion vector output from the motion-vector output unit specifies the reference prohibition region, the motion-vector output restricting unit prohibits the similarity information and luminance-component motion vector held by the motion-vector holding unit from being updated with the luminance-component motion vector and the similarity information corresponding thereto.

11. The image encoding device according to claim 1, further comprising a prediction-image generating unit that generates, from the reference image, a prediction image for comparing with the region to be encoded, based on the luminance-component motion vector output from the motion-vector output unit and the field type of the reference image referred to by the luminance-component motion vector; and when the chrominance-component motion vector generated based on the luminance-component motion vector output from the motion-vector output unit specifies the reference prohibition region, the motion-vector output restricting unit prohibits the luminance-component motion vector and the field type of the reference image from being output from the motion-vector output unit to the prediction-image generating unit.

12. An image encoding control method that controls processing for encoding data of an input moving image based on an interlace system by using a moving-image coding system that is capable of generating a chrominance-component motion vector based on a luminance-component motion vector during decoding, the image encoding control method comprising:

a step of sequentially receiving data of images obtained by at least vertically dividing an image in each field included in the input moving image, and receiving a luminance-component motion vector for searching for a region similar to a region to be encoded in one of the divided images from a reference image based on another divided image at the same position and a field type of the reference image referred to by the motion vector;

a step of determining whether a chrominance-component motion vector generated based on the luminance-component motion specifies a reference prohibition region preset at least one of outside an upper boundary and outside a lower boundary of the reference image, for each combination of a field type of the region to be encoded and the field type of the reference image; and a step of prohibiting, when the chrominance-component motion vector generated based on the luminance-component motion vector specifies the reference prohibition region, the luminance-component motion vector from being output as a motion vector specifying a region that is most similar to the region to be encoded.

13. A computer-readable storage medium including an image encoding control program to cause a computer to execute operations, the program comprising:

sequentially receiving data of images obtained by at least vertically dividing an image in each field included in the input moving image and receiving a luminance-component motion vector for searching for a region similar to a region to be encoded in one of the divided images from a reference image based on another divided image at the same position and a field type of the reference image referred to by the motion vector;

determining whether or not a chrominance-component motion vector generated based on the luminance-component motion specifies a reference prohibition region preset at least outside an upper boundary or a lower boundary of the reference image, for each combination of a field type of the region to be encoded and the field type of the reference image; and prohibiting, when the chrominance-component motion vector generated based on the luminance-component motion vector specifies the reference prohibition region, the luminance-component motion vector from being output as a motion vector specifying a region that is most similar to the region to be encoded.

14. An image encoding device that encodes data of an input moving image based on an interlace system, the image encoding device comprising:

a motion-vector output unit that sequentially receives data of images obtained by at least vertically dividing an image in each field included in the input moving image, and that outputs a luminance-component motion vector for searching for a region similar to a region to be encoded in one of the divided images from a reference image based on another divided image at the same position and a field type of the reference image referred to by the motion vector;

a reference-region determining unit that determines whether or not a chrominance-component motion vector generated based on the luminance-component motion vector output from the motion-vector output unit specifies a reference prohibition region preset at least one of outside an upper boundary and outside a lower boundary of the reference image, for each combination of a field type of the region to be encoded and the field type of the reference image, the field type of the reference image being output from the motion-vector output unit; and a motion-vector output restricting unit that prohibits, when it is determined that the chrominance-component motion vector generated based on the luminance-component motion vector output from the motion-vector output unit specifies the reference prohibition region, the luminance-component motion vector from being output as a motion vector specifying a region that is most similar to the region to be encoded.

* * * * *